(12) United States Patent
Yoon et al.

(10) Patent No.: US 12,513,011 B2
(45) Date of Patent: Dec. 30, 2025

(54) ELECTRONIC DEVICE INCLUDING PARTIAL LEDGER AND METHOD IN BLOCKCHAIN NETWORK

(71) Applicant: SAMSUNG ELECTRONICS CO., LTD., Suwon-si (KR)

(72) Inventors: Woongah Yoon, Suwon-si (KR); Wooup Kwon, Suwon-si (KR); Hun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 463 days.

(21) Appl. No.: 18/081,301

(22) Filed: Dec. 14, 2022

(65) Prior Publication Data
US 2023/0163982 A1 May 25, 2023

Related U.S. Application Data

(63) Continuation of application No. PCT/KR2022/016456, filed on Oct. 26, 2022.

(30) Foreign Application Priority Data

Nov. 24, 2021 (KR) .................. 10-2021-0163419
Dec. 30, 2021 (KR) .................. 10-2021-0193008

(51) Int. Cl.
*H04L 9/00* (2022.01)
*G06F 16/23* (2019.01)
(Continued)

(52) U.S. Cl.
CPC ............ *H04L 9/50* (2022.05); *G06F 16/2379* (2019.01); *G06F 21/64* (2013.01); *G06Q 20/401* (2013.01);
(Continued)

(58) Field of Classification Search
CPC ....... H04L 9/50; H04L 9/0825; H04L 9/3247; G06F 21/64
See application file for complete search history.

(56) References Cited

U.S. PATENT DOCUMENTS 10,097,356 B2  10/2018  Zinder
10,282,558 B2   5/2019  Chan et al.
(Continued)

FOREIGN PATENT DOCUMENTS

KR  10-2018-0074655 A   7/2018
KR  10-2019-0122843 A  10/2019
KR  10-2021-0134054 A  11/2021

OTHER PUBLICATIONS

International Search Report dated Feb. 1, 2023, issued by the International Searching Authority in International Application No. PCT/KR2022/016456 (PCT/ISA/210).
(Continued)

*Primary Examiner* — Ramy M Osman
(74) *Attorney, Agent, or Firm* — Sughrue Mion, PLLC

(57) ABSTRACT

An electronic device may include a memory storing a partial ledger including a part of a full ledger for a blockchain network, and at least one processor configured to generate an ending block as a block chained after the transaction block. The ending block includes an ending hash value of a transaction block and signature data and the signature data includes the ending hash value signed with a private key. The ending block may be chained after the transaction block. The ending block may be stored in the memory.

20 Claims, 16 Drawing Sheets

(51) Int. Cl.
  *G06F 21/64* (2013.01)
  *G06Q 20/40* (2012.01)
  *H04L 9/06* (2006.01)
  *H04L 9/08* (2006.01)
  *H04L 9/32* (2006.01)
  *H04L 67/104* (2022.01)

(52) U.S. Cl.
  CPC .......... *H04L 9/0637* (2013.01); *H04L 9/0825* (2013.01); *H04L 9/3247* (2013.01); *H04L 67/104* (2013.01)

(56) References Cited

U.S. PATENT DOCUMENTS

| | | | |
|---|---|---|---|
| 10,387,684 | B2 | 8/2019 | Carey et al. |
| 11,088,825 | B2 | 8/2021 | Holmberg et al. |
| 11,113,272 | B2 * | 9/2021 | Zhuo .................. G06F 16/2379 |
| 11,636,080 | B2 | 4/2023 | Ahmed-Rengers et al. |
| 12,192,373 | B2 * | 1/2025 | Mahony ............. G06Q 20/3827 |
| 2017/0264428 | A1 * | 9/2017 | Seger, II ............... H04L 9/3239 |
| 2018/0240114 | A1 * | 8/2018 | Li ......................... H04L 9/0637 |
| 2019/0132138 | A1 * | 5/2019 | Finlow-Bates ........... H04L 9/34 |
| 2019/0139136 | A1 | 5/2019 | Molinari et al. |
| 2019/0220603 | A1 * | 7/2019 | Gopalakrishnan ...... G06F 21/64 |
| 2019/0282906 | A1 | 9/2019 | Yong |
| 2019/0347663 | A1 * | 11/2019 | Li ......................... H04L 67/104 |
| 2019/0356674 | A1 | 11/2019 | Irazabal et al. |
| 2020/0034311 | A1 * | 1/2020 | Wang .................... H04L 9/0637 |
| 2020/0127812 | A1 * | 4/2020 | Schuler ................ H04L 9/0637 |
| 2020/0159717 | A1 * | 5/2020 | Park ...................... H04L 9/3239 |
| 2020/0311272 | A1 | 10/2020 | Mondello et al. |
| 2020/0313851 | A1 | 10/2020 | Mondello et al. |
| 2020/0409940 | A1 * | 12/2020 | Gu ....................... G06F 11/3006 |
| 2020/0409941 | A1 * | 12/2020 | Bellur ...................... G06F 21/64 |
| 2021/0160102 | A1 * | 5/2021 | Wang .................... H04L 9/0637 |
| 2021/0200750 | A1 * | 7/2021 | Zhang ................. G06F 16/2379 |
| 2021/0336793 | A1 | 10/2021 | Nishijima |
| 2021/0382860 | A1 * | 12/2021 | Newman ............... G06F 16/211 |
| 2023/0089235 | A1 * | 3/2023 | Zhang .................. H04L 67/104 705/75 |
| 2023/0163982 | A1 * | 5/2023 | Yoon .................... H04L 9/3247 713/189 |
| 2023/0299984 | A1 * | 9/2023 | Zhu ......................... H04L 63/12 713/168 |
| 2025/0158827 | A1 * | 5/2025 | Petersen .............. G06Q 20/401 |
| 2025/0190539 | A1 * | 6/2025 | Baek ....................... G06F 21/50 |

OTHER PUBLICATIONS

Written Opinion dated Feb. 1, 2023, issued by the International Searching Authority in counterpart International Application No. PCT/KR2022/016456 (PCT/ISA/237).

Yaga et al., "Blockchain Technology Overview," arXiv:1906.11078, Jun. 2019, Total 69 pages.

* cited by examiner

ELECTRONIC DEVICE INCLUDING PARTIAL LEDGER AND METHOD IN BLOCKCHAIN NETWORK

CROSS-REFERENCE TO RELATED APPLICATIONS

This application is a bypass continuation of PCT International Application No. PCT/KR2022/016456, which was filed on Oct. 26, 2022, and claims priority to Korean Patent Application No. 10-2021-0163419, filed on Nov. 24, 2021, and Korean Patent Application No. 10-2021-0193008, filed on Dec. 30, 2021, in the Korean Intellectual Property Office, the disclosures of which are incorporated herein by reference in their entireties.

BACKGROUND

1. Field

The disclosure relates to an electronic device for controlling function execution by using a blockchain network and an operation method thereof, and more specifically, to an electronic device for preventing forgery and/or alteration of a partial ledger, and an operation method thereof.

2. Description of Related Art

A blockchain network is expressed as a decentralized network, and is differentiated from a centralized network in which decision-making is performed by a central server. The blockchain network may refer to a network in which decision-making is performed according to a consensus algorithm for nodes participating in the blockchain network.

A distributed ledger of the blockchain network may include one or more blocks generated based on a transaction executed in the blockchain network and a database that stores data related to the transaction. A distributed ledger can be stored in each of nodes participating in the blockchain network. The distributed ledger of the blockchain network may be updated based on the consensus algorithm for the nodes participating in the blockchain network. In addition, the distributed ledger may include one or more blocks linked to each other. The linking of these blocks may be expressed as a blockchain.

The distributed ledger may include one or more blocks linked to each other, thereby preventing forgery and/or alteration of each of the one or more blocks.

A blockchain network may contain blockchain nodes that validate transactions in the blockchain system. For example, an electronic device that is used to participate in the blockchain network may be configured as a blockchain node of the blockchain network.

Nodes participating in the blockchain network must store and maintain data about a full blockchain in devices thereof for the integrity of a block. When the data about the full blockchain is not large, there is no problem. However, as the number of blocks increases, data about the full blockchain gradually increases. Therefore, there is a problem in that the nodes participating in the blockchain must store, maintain, and manage a large amount of data. In addition, when a node participating in the blockchain is a personal mobile device, the node may be unable to meet the required level of performance.

In a blockchain network using an identical distributed ledger, all blockchain nodes included in the blockchain network have an identical copy of the ledger, and thus a forged block may be detected by comparing the distributed ledgers stored in the respective blockchain nodes. However, in a blockchain network using a partial ledger, the distributed ledgers stored in respective blockchain nodes are not identical, and a forged block may not be detected by comparing the distributed ledgers stored in the respective blockchain nodes.

Additionally, when the forged block is an intermediate block among multiple blocks included in a distributed ledger, the forged block may be detected based on information about its previous block, stored in each of the multiple blocks. However, when a last block is forged, the forged block may not be detectable using only information about its previous block.

SUMMARY

According to an aspect of the disclosure, an electronic device constituting a blockchain node included in a blockchain network, includes: a communication circuit configured to communicate with at least one external device; a memory storing a partial ledger including a part of a full ledger for the blockchain network; and at least one processor configured to: based on a first transaction block being generated in the blockchain network at an end of a blockchain included in the partial ledger stored in the memory, generate a first ending hash value based on first identification data of the first transaction block; generate first ending signature data by signing the first ending hash value with a private key stored in the memory; generate a first ending block as a block chained after the first transaction block, and store the first ending block in the memory, wherein the first ending block includes the first ending signature data and the first ending hash value; receive, through the communication circuit, a second ending block from a first external device participating in a consensus on the first transaction block, wherein the second ending block includes the first ending hash value and second ending signature data, and the second ending signature data includes the first ending hash value signed with a private key of the first external device; and store the second ending block in the memory.

The at least one processor may be further configured to: receive a third ending block from a second external device participating in the consensus on the first transaction block; and store the third ending block in the memory as a block chained after the first transaction block, wherein the third ending block includes the first ending hash value and third ending signature data, and the third ending signature data includes the first ending hash value signed with a private key of the second external device.

The at least one processor may be further configured to: based on a second transaction block being generated in the blockchain network, replace the first ending block with the second transaction block; generate a second ending hash value, based on second identification data of the second transaction block; generate fourth ending signature data by signing the first ending hash value with the private key stored in the memory; generate a fourth ending block as a block chained after the second transaction block, wherein the fourth ending block includes the fourth ending signature data and the second ending hash value; and store the fourth ending block in the memory.

The at least one processor may be further configured to: determine whether the first external device participates in a consensus on the second transaction block; based on determining that the first external device participates in the consensus on the second transaction block, delete the second ending block; receive, through the communication circuit, a fifth ending block from the first external device, wherein the fifth ending block includes the second ending hash value and fifth ending signature data, and the fifth ending signature data includes the second ending hash value signed with the private key of the first external device; and store the fifth ending block in the memory.

The at least one processor may be further configured to: based on the electronic device not participating in a consensus on a third transaction block, acquire an encrypted transaction block from an external device participating in the consensus on the third transaction block, wherein the encrypted transaction block is generated by encrypting the third transaction block; detect an ending block associated with the external device participating in the consensus on the third transaction block; and replace the detected ending block with the encrypted transaction block.

The at least one processor may be further configured to: verify the first transaction block, based on first signature data, second signature data, and a public key of the first external device included in the first transaction block, wherein the first signature data includes the first identification data signed with the private key stored in the memory, and the second signature data includes the first identification data signed with the private key of the first external device.

The at least one processor may be further configured to, based on the second transaction block being generated in the blockchain network: determine whether the first ending block for the first transaction block exists; determine whether an encrypted transaction block or the second ending block for the first transaction block exists; and verify the partial ledger, based on results of the determinations.

The at least one processor may be further configured to: acquire the first ending block from the first external device, based on determining that the first ending block does not exist, and store the first ending block in the memory; and acquire the encrypted transaction block or the second ending block from the first external device, based on determining that the second ending block or the encrypted transaction block does not exist, and store the encrypted transaction block or the second ending block in the memory.

According to an aspect of the disclosure, a method for operating an electronic device constituting a blockchain node included in a blockchain network, includes: storing a partial ledger including a part of a full ledger for the blockchain network; based on to a first transaction block being generated in the blockchain network, generating a first ending hash value based on first identification data of the first transaction block; generating first ending signature data by signing the first ending hash value with a private key of the electronic device; generating a first ending block including the first ending signature data and the first ending hash value; storing the first ending block in the electronic device as a block chained after the first transaction block; receiving a second ending block from a first external device participating in a consensus on the first transaction block, wherein the second ending block includes the first ending hash value and second ending signature data, and the second ending signature data includes the first ending hash value signed with a private key of the first external device; and storing the second ending block in the electronic device.

The method may further include: receiving a third ending block from a second external device participating in the consensus on the first transaction block; and storing the third ending block in the electronic device as a block chained after the first transaction block, wherein the third ending block includes the first ending hash value and third ending signature data, and the third ending signature data includes the first ending hash value signed with a private key of the second external device.

The method may further include: based on generation of a second transaction block after the generation of the first transaction block, replacing the first ending block with the second transaction block; generating a second ending hash value, based on second identification data of the second transaction block; generating fourth ending signature data by signing the first ending hash value with the private key of the electronic device; generating a fourth ending block as a block chained after the second transaction block, wherein the fourth ending block includes the fourth ending signature data and the second ending hash value; and storing the fourth ending block in the electronic device.

The method may further include: determining whether the first external device participates in a consensus on the second transaction block; deleting the second ending block in response to determining that the first external device participates in the consensus on the second transaction block; receiving a fifth ending block from the first external device, wherein the fifth ending block includes the second ending hash value and fifth ending signature data, and the fifth ending signature data includes the second ending hash value signed with the private key of the first external device; and storing the fifth ending block in the electronic device.

The method may further include: acquiring an encrypted transaction block from an external device participating in a consensus on a third transaction block, based on the electronic device not participating in the consensus on the third transaction block, wherein the encrypted transaction block is generated by encrypting the third transaction block; detecting an ending block associated with the external device participating in the consensus on the third transaction block; and replacing the detected ending block with the encrypted transaction block.

The method may further include: based on the second transaction block being generated in the blockchain network, determining whether the first ending block for the first transaction block exists; based on the second transaction block being generated in the blockchain network, determining whether an encrypted transaction block or the second ending block for the first transaction block exists; and verifying the partial ledger, based on results of the determinations.

The method may further include: based on determining that the first ending block does not exist, acquiring the first ending block from the first external device and storing the first ending block in the electronic device; and based on determining that the second ending block or the encrypted transaction block does not exist, acquiring the encrypted transaction block or the second ending block from the first external device and storing the encrypted transaction block or the second ending block in the electronic device.

According to an aspect of the disclosure, an electronic device constituting a blockchain node included in a blockchain network, includes: a memory storing a partial ledger including a part of a full ledger for the blockchain network; and at least one processor configured to: based on first signature data and first identification data of a first transaction block at an end of a blockchain included in the partial ledger, verify whether the blockchain has been altered; determine whether a first ending block for the first transaction block exists, wherein the first ending block includes a first ending hash value generated based on the first identification data, and first ending signature data, and the first ending signature data includes the first ending hash value signed with a private key stored in the memory; determine whether a second ending block for the first transaction block exists, wherein the second ending block includes the first ending hash value and second ending signature data, and the second ending signature data includes the first ending hash value signed with a private key of a first external device participating in a consensus on the first transaction block; based on determining that the second ending block does not exist, determine whether an encrypted second transaction block exists, and verify alteration of the blockchain, based on the first ending block, and the second ending block or the encrypted second transaction block.

The at least one processor may be further configured to: based on determining that the first ending block does not exist, acquire the first ending block from the first external device; and store the first ending block in the memory.

The at least one processor may be further configured to: based on determining that the second ending block or the encrypted second transaction block does not exist, acquire the encrypted second transaction block or the encrypted second ending block from the first external device and store the second ending block or the encrypted second transaction block in the memory.

The at least one processor may be further configured to: determine whether the first transaction block exists in a partial ledger of the first external device; and based on determining that the first transaction block does not exist in the partial ledger of the first external device, transmit the first transaction block to the first external device.

The at least one processor may be further configured to: determine whether the first ending block exists in a partial ledger of the first external device; based on determining that the first ending block does not exist, determine whether an encrypted third transaction block for the electronic device exists in the partial ledger of the first external device; based on determining that the encrypted third transaction block exists, acquire information about a third transaction block from a second external device participating in a consensus on the third transaction block; and store the third transaction block as an ending block of the blockchain.

The systems and methods described herein provide a number of technical effects and benefits. Various embodiments in the disclosure provide for an electronic device that may efficiently use its memory by storing a partial ledger including at least a part of a distributed ledger when forming a blockchain network with external electronic devices.

According to an aspect of the disclosure, the electronic device may ensure the reliability and integrity of blocks included in the partial ledger. For example, the electronic device may detect a forged block from among multiple blocks included in a partial ledger, even when the forged block is a last generated block among the multiple blocks.

According to an aspect of the disclosure, the electronic device may recover a genuine block corresponding to a forged block with reference to blockchain nodes included in a blockchain network. A blockchain node in the blockchain network may recover the genuine block based on information about the block provided by the electronic device.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Hereinafter, various embodiments of the disclosure will be described with reference to the accompanying drawings. This is not intended to limit the disclosure to specific embodiments, and it should be understood that various modifications, equivalents, and/or alternatives of the embodiments of the disclosure are included.

Figure 1:
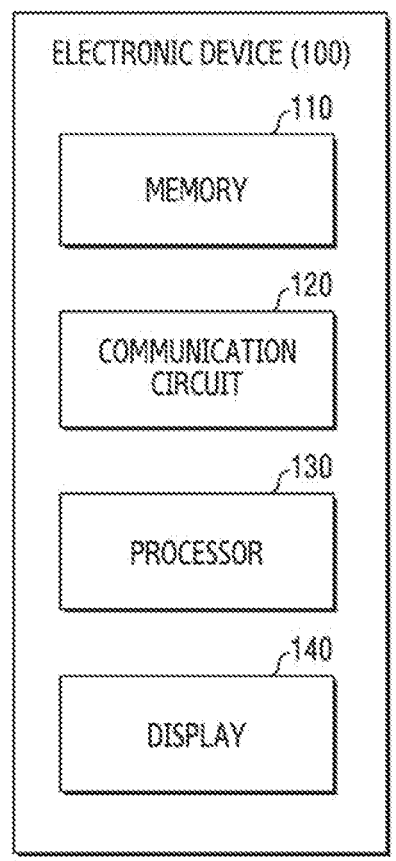
FIG. 1 is a block diagram of an electronic device according to an embodiment.

FIG. 1 is a block diagram of an electronic device according to an embodiment.

Referring to FIG. 1, an electronic device 100 may include a memory 110, a communication circuit 120, a processor 130, and a display 140, or a combination thereof. In various embodiments, the electronic device 100 may include an additional element in addition to the elements illustrated in FIG. 1, or at least one of the elements illustrated in FIG. 1 may be omitted.

According to an embodiment, the memory 110 may store instructions which, when being executed, cause the processor 130 to process data or control the elements of the electronic device 100 in order to perform an operation of the electronic device 100. The memory 110 may include a secure area or a separate secure storage medium (e.g., a secure memory area accessible only through a secure OS (e.g., a trust zone)). According to an embodiment, the memory 110 may include at least one blockchain application for performing a blockchain-related operation. For example, a blockchain platform, which corresponds to a blockchain module or a blockchain application for performing a blockchain-related operation, may be included.

According to an embodiment, the memory 110 may store a private key and a public key of the electronic device 100 for a blockchain network. For example, the processor 130 may generate a private key of the electronic device 100 when a blockchain network is formed, and may generate a public key based on the private key. The processor 130 may store the generated private key and public key in the memory 110. According to an embodiment, the processor 130 may store the generated private key and public key in the secure area of the memory 110.

According to an embodiment, the memory 110 may store a distributed ledger for a blockchain network. According to another embodiment, when the electronic device 100 is included as a blockchain node in a blockchain network, the memory 110 may store a partial ledger including a part of the distributed ledger for the blockchain network. Hereinafter, a partial distributed ledger distinguished from a full ledger may be expressed as a partial ledger. Therefore, the electronic device 100 may store a full ledger or a partial ledger depending on the capacity of the memory 110 or the configuration of a blockchain network.

According to an embodiment, a distributed ledger may include a blockchain in which one or more blocks, each of which containing at least one transaction, are linked to each other. In addition, the distributed ledger may include a state database that stores state data related to the at least one transaction executed in a blockchain network. According to an embodiment, the memory 110 may store a partial ledger including at least one block corresponding to at least one transaction in which the electronic device 100 participates in consensus. In addition, the memory 110 may store, in the state database, data on the at least one transaction in which the electronic device 100 participates in consensus. Therefore, the electronic device 100 may efficiently manage the memory 110 by storing, in the memory 110, only a block related to the transaction in which the electronic device 100 participated in consensus.

According to an embodiment, the communication circuit 120 may be configured to be connected to an external device so as to transmit or receive data to or from the external device. According to an embodiment, the electronic device 100 may form a blockchain network with at least one external device through the communication circuit 120. The blockchain network may include at least one external device and the electronic device 100 as blockchain nodes. Therefore, the electronic device 100 and/or the at least one external device may function as a client as well as a blockchain node. In an embodiment, the electronic device 100 may transmit/receive data to and from the at least one external device included in the blockchain network through the communication circuit 120, and may perform a transaction consensus in the blockchain network.

According to various embodiments, the blockchain network may include a peer node and/or an ordering node as a blockchain node. According to an embodiment, the blockchain node is the electronic device 100 and/or an external electronic device, and may indicate a portable electronic device. For example, the electronic device 100 and/or the external electronic device may be one of a mobile, a tablet PC, and/or a laptop. However, the blockchain network is not limited thereto, and may include various nodes depending on the type of the blockchain network.

According to an embodiment, the processor 130 may be electrically or operatively connected to the memory 110, the communication circuit 120, and the display 140. According to an embodiment, the processor 130 may use the instructions stored in the memory 110 to control at least one other element of the electronic device 100 and/or perform data processing or calculation about communication. According to an embodiment, the processor 130 may include at least one among a central processing unit (CPU), a graphics processing unit (GPU), a microcontroller unit (MCU), a sensor hub, a supplementary processor, a communication processor, an application processor, an application specific integrated circuit (ASIC), and a field-programmable gate array (FPGA), and may have multiple cores.

According to an embodiment, the processor 130 may perform a blockchain-related operation through the blockchain platform stored in the memory 110. According to an embodiment, the processor 130 may obtain a transaction execution request. For example, the processor 130 may sense a transaction execution request from a user of the electronic device 100.

According to an embodiment, in response to generation of a transaction block in the blockchain network, the processor 130 may generate an ending hash value, based on identification data for the generated transaction block. For example, in response to generation of a first transaction block at the end of a blockchain included in a partial ledger, the processor 130 may generate a first ending hash value based on first identification data (e.g., a hash value) for the first transaction block. For example, the processor 130 may generate the first ending hash value through a hash function, based on the first identification data for the first transaction block. According to various embodiments, the processor 130 may generate the first ending hash value, based on a value unique to the first transaction block. Hereinafter, various hash values disclosed herein are not limited to hash values, and any unique identification value may be referred to as a hash value.

According to an embodiment, the processor 130 may generate an ending signature data by signing the ending hash value for the generated transaction by means of a private key of the electronic device stored in the memory 110. For example, the processor 130 may generate first ending signature data by signing the first ending hash value corresponding to the first transaction block by means of a private key of the electronic device.

According to an embodiment, the processor 130 may generate an ending block including at least the ending hash value and the ending signature data. Furthermore, the processor 130 may store the generated ending block in the memory 110 in association with the partial ledger. For example, the processor 130 may generate a first ending block including at least the first ending signature data and the first ending hash value, and may store the generated first ending block in the memory 110 as a block chained after the first transaction block.

According to an embodiment, when a transaction block is generated at the end of the blockchain included in the partial ledger, the processor 130 may receive an ending block generated by an external device from the external device participating in a consensus on the transaction block. According to an embodiment, the ending block received from the external device may include the ending hash value, and may include signature data generated by signing the ending hash value by means of a private key of the external device.

For example, when the first transaction block is generated at the end of the blockchain included in the partial ledger, the processor 130 may receive a second ending block from a first external device participating in a consensus on the first transaction block. In an embodiment, the second ending block may include the first ending hash value, and may include second signature data generated by signing the first ending hash value by means of a private key of the first external device. The second signature data includes data that the first external device generates by signing the first ending hash value with the private key of the external device. According to an embodiment, the processor 130 may store the first ending block and the second ending block in the memory 110 as blocks chained after the first transaction block. According to an embodiment, the processor 130 may receive an ending block from each of at least one external device participating in a consensus on a transaction block. For example, when not only the first external device but also a second external device participates in a consensus on the first transaction block, an ending block may be received from the second external device. For example, the processor 130 may receive a third ending block from the second external device participating in the consensus on the first transaction block, and may store the third ending block in the memory 110 as a block chained after the first transaction block. In an embodiment, the third ending block may include the first ending hash value and third ending signature data generated by signing the first ending hash value by means of a private key of the second external device.

According to an embodiment, the external device may guarantee that the external device has generated an ending block, based on signature data generated by signing an ending hash value by means of the private key of the external device. According to an embodiment, the processor 130 may use a public key of the external device, included in a transaction block for an ending block, to verify the signature data generated by signing the ending hash value by means of the private key of the external device.

The electronic device 100 according to an embodiment may verify, based on the ending block for the transaction block, whether at least one block included in the partial ledger is forged, and may recover a forged block. Operations in which the electronic device 100 verifies, using the ending block, whether the partial ledger has been forged and recovers a forged block will be described later with reference to FIGS. 9A to 10.

According to an embodiment, the display 140 may display various types of contents (e.g., text, an image, a video, an icon, and/or a symbol, etc.). According to an embodiment, the display 140 may include a liquid crystal display (LCD), a light-emitting diode (LED) display, or an organic light-emitting diode (OLED) display.

According to an embodiment, the processor 130 may display various types of contents related to a blockchain application through the display 140. For example, the processor 130 may display, through the display 140, a content indicating a notification of success or failure in a transaction which is requested to be performed. For example, when there is an altered block among multiple blocks included in a partial ledger, the processor 130 may display a notification of the altered block through the display 140. Furthermore, when recovering the altered block, the processor 130 may display a notification of the block recovery through the display 140. According to various embodiments, the processor 130 may output various types of contents related to the blockchain application by using various elements included in the electronic device 100 without being limited to the display 140.

Figure 2:
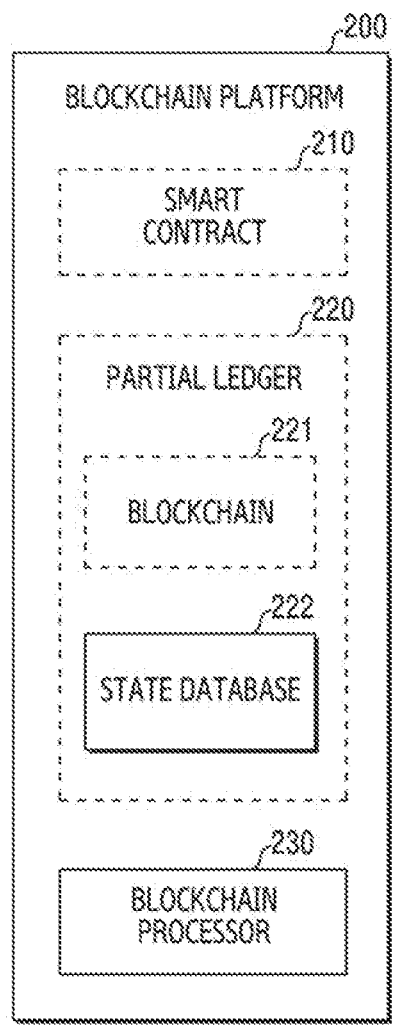
FIG. 2 illustrates a blockchain platform of an electronic device according to an embodiment.

FIG. 2 illustrates a blockchain platform of an electronic device according to an embodiment.

Referring to FIG. 2, the electronic device 100 may include a blockchain platform 200. According to an embodiment, the blockchain platform 200 may correspond to a blockchain application for performing an operation related to a blockchain stored in the memory 110 or a blockchain module for performing an operation related to a blockchain included in the processor 130.

According to an embodiment, the blockchain platform 200 may include a smart contract 210, a partial ledger 220, and/or a blockchain processor 230. According to various embodiments, the blockchain platform 200 may further include various elements to perform blockchain-related operations, or some elements may be omitted.

According to an embodiment, the blockchain processor 230 may be included in the processor 130. The blockchain processor 230 may control operations of the elements included in the blockchain platform 200. For example, the blockchain processor 230 may perform transaction execution including ledger synchronization, transaction signing, and/or transaction recording on a blockchain network.

According to an embodiment, the blockchain platform 200 may include the smart contract 210. The smart contract 210 may imply a script or a software code that is used for transaction processing in a blockchain-based system. For example, the smart contract 210 may be a code in which various conditions, states, and actions according to the conditions used for transaction processing are written in a programmatic manner, and may include a smart contract in Ethereum, chaincode in Hyperledger Fabric, etc. In the blockchain-based system, blockchain nodes may share the uploaded smart contract 210.

In an embodiment, the blockchain platform 200 may store the partial ledger 220 that is a part of a distributed ledger for a blockchain network in which the electronic device 100 is configured as a blockchain node. The partial ledger 220 may include a blockchain 221, which is a linked-list of blocks including data about transactions executed in the blockchain network, and a state database 222 for storing world state data.

In an embodiment, the partial ledger 220 may include the blockchain 221 and the state database 222. According to an embodiment, the partial ledger 220 may store data about transactions related to the electronic device 100 in the blockchain network. For example, the electronic device 100 may store a block and data based on a transaction participating in consensus processing. According to an embodiment, the partial ledger 220 may be a partial ledger including at least a part of a full ledger of the blockchain network. For example, the partial ledger 220 may be a partial ledger storing blocks and data regarding transactions related to the electronic device 100 in the full ledger that stores blocks and data related to all transactions in the blockchain network.

According to an embodiment, the blockchain 221 may include at least one block generated through a blockchain network. A block may include a block header and transaction data.

In an embodiment, block data may include block metadata. The block metadata may include at least one of an identification value of a block producer, a related signature, a last constituent block number, and a flag of each transaction included in a block. The structure of a block according to an embodiment will be described later in detail with reference to FIG. 3.

In an embodiment, a transaction may include a smart contract (or chaincode). The smart contract may be executed in response to a transaction request, and world state data may be updated based thereon.

In an embodiment, blocks of the partial ledger 220 form a chain (e.g., a linked-list) and block data may be stored in the partial ledger 220. For example, at least one block included in the blockchain 221 may include a hash field and block data. According to an embodiment, the hash field may include previous block information in a full ledger of a blockchain network and previous block information in a partial ledger of the blockchain network. Therefore, the at least one block included in the blockchain 221 may be expressed as being linked based on the previous block information included in the hash field. In an embodiment, block data may include transaction data on the corresponding block.

According to an embodiment, the blockchain 221 may include various types of blocks. For example, the blockchain 221 may include a genesis block, which is a block that is first generated in response to the generation of a blockchain network. Hereinafter, the genesis block may be expressed as an initial block.

Furthermore, the blockchain 221 may include a transaction block generated based on the consensus of blockchain nodes in the blockchain network. The transaction block may refer to a block generated through a transaction verification operation, a guarantee operation, an ordering operation, and/or a transaction block consensus operation, performed through the blockchain nodes included in the blockchain network.

Furthermore, the blockchain 221 may include an ending block for the last generated transaction block among transaction blocks generated in the blockchain network. According to various embodiments, the blockchain 221 may include an ending block generated by the electronic device 100, an ending block received from an external device included in the blockchain network, and/or an encrypted transaction block received from the external device included in the blockchain network.

In an embodiment, the state database 222 may store world state data, changed due to transaction execution in the blockchain network, in the form of a key-value. According to an embodiment, the form of the key-value may include a key of data, a data value and/or a hash value of the data. In an embodiment, data stored in the state database 222 may be expressed as state data. The state data, for example, may refer to data stored in a world state which is a database used in the Hyperledger Fabric. However, the state database 222 is not limited thereto, and a level database or a couch database may be used as the state database 222.

The state database 222 may store final values, changed by executing a transaction, in the form of a key-value. Therefore, the electronic device 100 may determine the state database 222 to determine the final values according to the transaction execution in the blockchain network.

According to an embodiment, the state database 222 may store data on a transaction in which a user of the electronic device 100 is involved. For example, values changed by execution of a transaction related to the electronic device 100 in a blockchain network may be stored.

According to an embodiment, the blockchain processor 230 may control an operation in which the electronic device 100 processes a transaction consensus in a blockchain network. For example, the blockchain processor 230 may perform an operation of processing a transaction consensus, based on a consensus algorithm used in the blockchain network. The blockchain processor 230 may support various consensus algorithms used in a typical blockchain. For example, the blockchain processor 230 may perform, based on proof of work (POW), proof of stake (POS), PBFT, or RAFT, a consensus on a transaction block with blockchain nodes included in the blockchain network.

According to various embodiments, the blockchain processor 230 may perform various operations related to a blockchain network in which the electronic device 100 participates as a blockchain node. According to an embodiment, the blockchain processor 230 may form a blockchain network, and may perform operations related to other nodes (external devices) included in the blockchain network.

Figure 3:
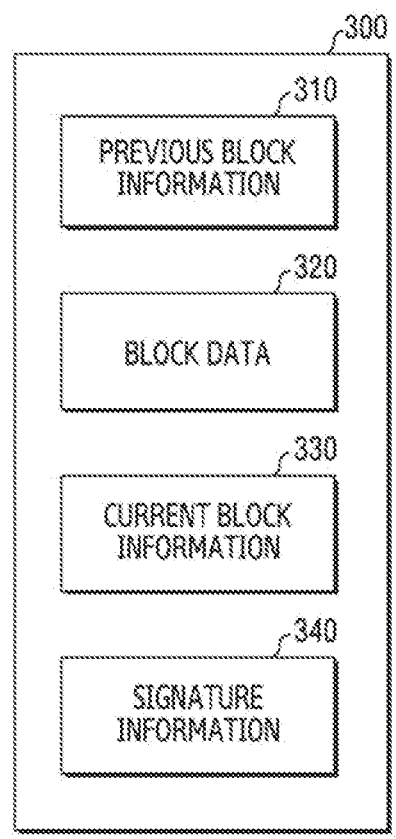
FIG. 3 illustrates the structure of a block stored in a partial ledger according to an embodiment.

FIG. 3 illustrates the structure of a block stored in a partial ledger according to an embodiment.

Referring to FIG. 3, the structure of a transaction block among multiple blocks included in the blockchain 221 of the electronic device 100 is illustrated.

According to an embodiment, a transaction block 300 may include previous block information 310, block data 320, current block information 330, and/or signature information 340. According to an embodiment, the transaction block 300 may be generated when a request for generation of a transaction is made in a blockchain network and then a consensus on the transaction is achieved.

According to an embodiment, the previous block information 310 may include information about a block generated before the generation of the transaction block 300 in the blockchain network. For example, the previous block information 310 may include previous block information in the partial ledger 220 stored in the electronic device 100 and/or previous block information in a full ledger for the blockchain network. For example, the previous block information 310 may include a hash value of a block, which is generated before generation of the transaction block 300, among blocks included in the blockchain 221 of the partial ledger 220. Furthermore, the previous block information 310 may include a hash value of a block, which is generated before the generation of the transaction block 300, among all blocks generated in the blockchain network.

According to an embodiment, the block data 320 may include transaction data of the transaction block 300. For example, the block data 320 may include at least one among a hash value of at least a part of the transaction data, smart contract version information, smart contract ID, smart contract function ID, smart contract data, which is the argument value (e.g., read-set) required for a smart contract function, data returned by the smart contract function (e.g., read-set, write-set, or delete-set), a nonce value which is a transaction generation number of a transaction producer, a public key of the transaction producer, a value obtained by signing a hash value by means of a private key of the transaction producer, an attestation key certificate chain, or a value obtained by signing a hash value by means of an attestation key. Furthermore, block data may include at least one among the type of transaction, a transaction version, a timestamp, a channel identification value of a blockchain network, epoch, the degree of payload exposure, a chaincode path, a chaincode name, a chaincode version, a chaincode type, timeout, a transaction endorser's identification value and the endorser's signature, a response status, a namespace, a read set, a write set, a read list, and a Merkle tree query summary.

According to an embodiment, the current block information 330 may include information about the transaction block 300. For example, the current block information 330 may include a block hash value which is identification information unique to the transaction block 300. According to an embodiment, the current block information 330 may include at least one of hash values of a header and a data area, a height value of a block, and a hash value of state data after a transaction included in the block is performed.

According to an embodiment, the current block information 330 may be based on at least one of a hash value of a previous block in a full ledger, the block data 320, and/or public keys of devices participating in a consensus on the transaction block 300. For example, the current block information 330 obtained by hashing at least one of a hash value of a previous block in a full ledger, the block data 320, and/or public keys of devices participating in a consensus on the transaction block 300.

According to an embodiment, the signature information 340 may include various types of signature information for generation of the transaction block 300. For example, the signature information 340 may include a public key of a device, which has agreed to generate the transaction block 300, among blockchain nodes included in the blockchain network. Furthermore, the signature information 340 may include signature data generated by signing the current block information 330 by means of the private key of the device participating in the consensus on the transaction block 300. For example, when the electronic device 100 and a first external device participate in the consensus on the transaction block 300, the signature information 340 may include a public key of the electronic device 100 and a public key of the first external device. Furthermore, the signature information 340 may include signature data obtained by digitally signing the current block information 330 by means of the private key of the electronic device 100 and signature data obtained by digitally signing the current block information 330 by means of the private key of the first external device. For example, the signature information 340 may include signature data generated by signing a hash value of the current block by means of the private key of the electronic device 100 and signature data generated by signing the hash value of the current block by means of the private key of the first external device. According to various embodiments, the signature information 340 may include one among a public key of a block producer, signature data generated by signing a block hash value by means of a private key of the block producer, an attestation key certificate chain, or a value obtained by signing a hash value by means of an attestation key.

According to various embodiments, a part of the above-mentioned data included in the signature information 340 may be included in the block data 320. For example, the public key of the device, which has agreed to generate the transaction block 300, among the blockchain nodes included in the blockchain network, may be included in the block data 320.

According to an embodiment, transaction blocks included in the blockchain network may be linked each other in a linked-list structure, based on previous block information (e.g., the previous block information 310) stored in each of the transaction blocks. According to an embodiment, the previous block information 310 may include not only previous block information in a full ledger but also previous block information in a partial ledger, and thus even the partial ledger instead of the full ledger is stored, the reliability and integrity of the blocks included in the partial ledger may be secured. According to an embodiment, the electronic device 100 may determine the validity of the signature data by using the public keys included in the signature information 340 of the transaction block 300, and may prevent forgery/alteration of a block.

Figure 4:
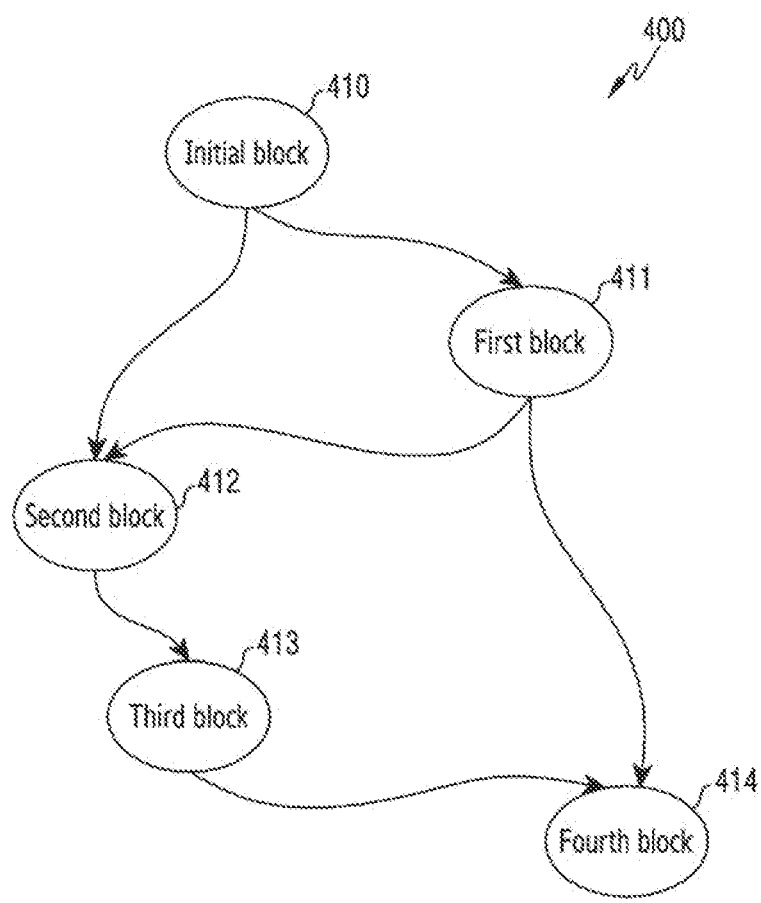
FIG. 4 illustrates the structure of a blockchain included in a full ledger according to an embodiment.

FIG. 4 illustrates the structure of a blockchain included in a full ledger according to an embodiment.

Referring to FIG. 4, a linking structure of blocks included in a distributed ledger 400 of a blockchain network is illustrated. The distributed ledger 400 in FIG. 4 may represent a structure in which an ending block is omitted. The electronic device 100 according to an embodiment may include the partial ledger 220 including at least a part of the distributed ledger 400.

According to an embodiment, the distributed ledger 400 of the blockchain network may include an initial block 410 and first to fourth blocks 411 to 414. According to an embodiment, a block for a transaction related to generation of a blockchain network may be included as the initial block 410 among the blocks included in the blockchain of the distributed ledger 400. An initial block among blocks included in a blockchain can be expressed as a genesis block of the blockchain. In an embodiment, the initial block 410 may correspond to a root node of the blockchain. For example, a genesis block may be included as an initial block in each of a full ledger (e.g., the distributed ledger 400) and the partial ledger 220. According to one embodiment, the first to fourth blocks 411 to 414 may be blocks generated based on first to fourth transactions, respectively.

According to an embodiment, the distributed ledger 400 may include the initial block 410 and the first to fourth blocks 411 to 414, linked in a directed acyclic graph (DAG) structure. For example, a block included in the distributed ledger 400 may include information about a previous block (e.g., the previous block information 310) and current block information, and a next block may include the current block information as previous block information. Therefore, the previous block and the next block may be linked to each other. Therefore, each of the initial block 410 and the first to fourth blocks 411 to 414 may correspond to a node of a DAG graph.

According to an embodiment, the linking structure of the initial block 410 and the first to fourth blocks 411 to 414 may be formed based on previous block information (e.g., the previous block information 310 in FIG. 3) and/or current block information (e.g., the current block information 330 in FIG. 3) included in each of the blocks. According to an embodiment, each block may include previous block information and current block information. For example, the initial block 410 may include an initial block hash indicating the initial block 410. Furthermore, the previous block information included in each block may include a previous block hash value indicating previous block information in a full ledger and a previous block hash value indicating previous block information in a partial ledger. For example, at least one block, which has the initial block 410 as a previous block in a full ledger or a partial ledger, may include information about the initial block 410 (e.g., a hash value of the initial block 410) in the previous block information. Therefore, the full ledger or the partial ledger may have a structure in which the corresponding block is linked to a next block through previous block information (e.g., a hash value of the previous block) of the next block by using a block hash included in the corresponding block.

According to an embodiment, when a next block, including current block information (a hash value of a current block) included in a previous block, is generated, the previous block and the next block may be linked to each other. Therefore, it may be expressed that linking using previous block information and current block information has been made to another block according to a directed acyclic graph.

According to an embodiment, the initial block 410, which is a genesis block, may corresponds to a root node, and may be linked to the first block 411 and the second block 412. For example, each of the first block 411 and the second block 412 may include a hash value of the initial block 410 as previous block information, and thus the initial block 410 may be linked to the first block 411 and the second block 412.

According to an embodiment, the first block 411 may be linked to the second block 412 and the fourth block 414. For example, each of the second block 412 and the fourth block 414 may include a hash value of the first block 411 as previous block information, and thus the first block 411 may be linked to the second block 412 and the fourth block 414.

According to an embodiment, the second block 412 may be linked to the third block 413. For example, the third block 413 may include a hash value of the second block 412 as previous block information, and thus the third block 413 may be linked to the second block 412.

According to an embodiment, the third block 413 may be linked to the fourth block 414. For example, the fourth block 414 may include a hash value of the third block 413 as previous block information, and thus the third block 413 may be linked to the fourth block 414.

According to an embodiment, each of some of the blockchain nodes included in the blockchain network may store at least a part of the distributed ledger 400 in the memory thereof. For example, the electronic device 100, which is a blockchain node included in the blockchain network, may store the partial ledger 220, which is a part of the distributed ledger 400, in the memory 110. In this case, a mobile node may store a part of the distributed ledger 400 in a memory thereof in a subgraph structure of the DAG. Furthermore, the mobile node may store a partial ledger (e.g., the partial ledger 220) including only blocks for transactions related to the mobile node in the memory thereof. For example, the electronic device 100 may store a part of the distributed ledger 400 in the memory 110 in a sub-graph structure. Furthermore, some of blockchain nodes included in the blockchain network may store the entirety of the distributed ledger 400 in the memories thereof.

Figure 5:
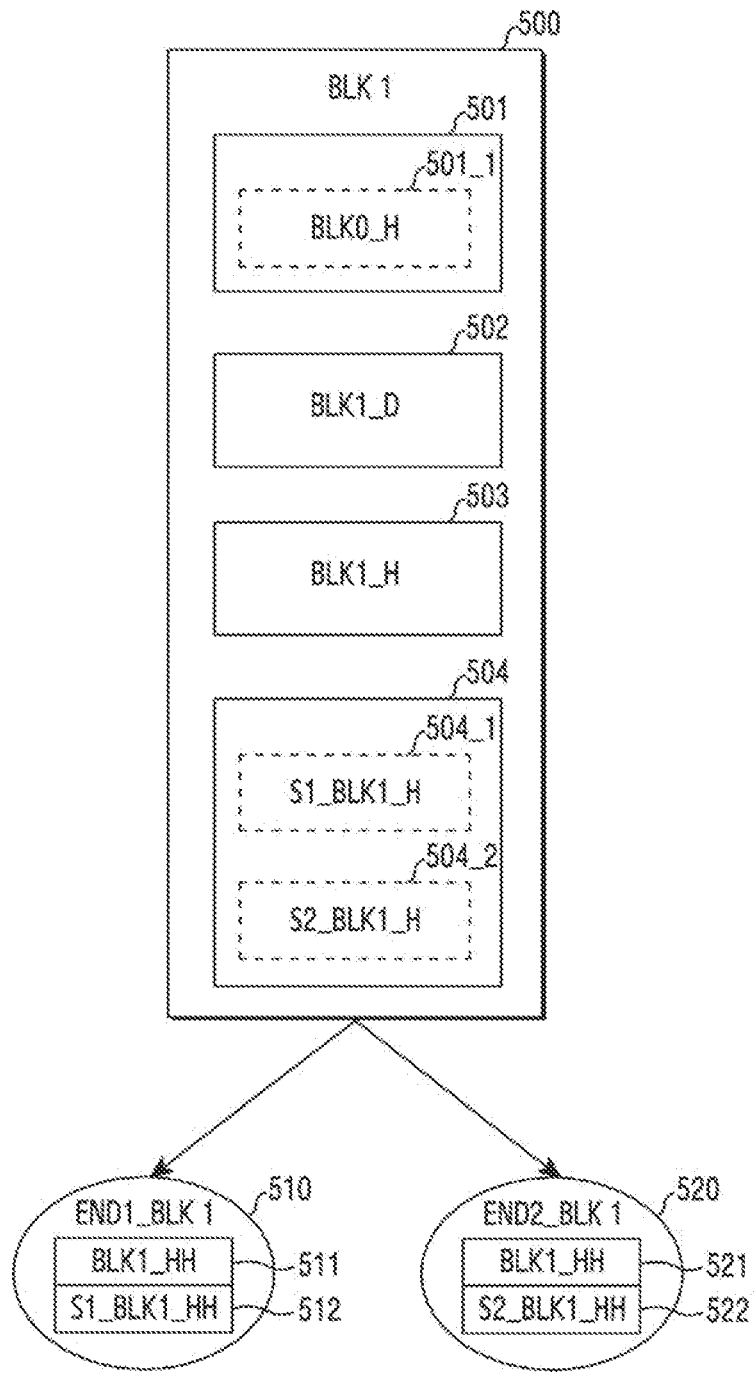
FIG. 5 illustrates an ending block for a transaction block according to an embodiment.

FIG. 5 illustrates an ending block for a transaction block according to an embodiment.

Referring to FIG. 5, blockchain nodes included in a blockchain network may store a transaction block in respective memories of the blockchain nodes when a transaction is generated. Hereinafter, a first blockchain node may indicate the electronic device 100. Therefore, the operation of the first blockchain node may imply the operation of the electronic device 100.

For example, when a first transaction block 500 is generated, the first blockchain node (e.g., the electronic device 100) may store the first transaction block 500 in the memory 110 as an ending block in the blockchain 221 of the partial ledger 220.

According to an embodiment, the first transaction block 500 may include first previous block information 501, first block data 502, first block information 503, and/or first signature information 504. The first previous block information 501 may be the same as or similar to the previous block information 310. The first block data 502 may be the same as or similar to the block data 320. The first block information 503 may be the same as or similar to the current block information 330. Furthermore, the first signature information 504 may be the same as or similar to the signature information 340. Therefore, a description overlapping with the description of the transaction block 300, made with reference to FIG. 3, may be omitted below.

According to an embodiment, the processor 130 may store the first transaction block 500 in the memory 110 in response to the generation of the first transaction block 500. For example, the processor 130 may add the first transaction block 500 to the blockchain 221 as an ending block in response to a partial ledger 220 update request according to the generation of the first transaction block 500.

According to an embodiment, the first transaction block 500 may indicate a block generated after an initial block (e.g., the initial block 410 in FIG. 4) generated in a blockchain network. In an embodiment, the first previous block information 501 may include identification data of the initial block. For example, the first previous block information 501 may include hash information BLK0_H of the initial block as initial block information 501_1.

According to an embodiment, the first block data 502 may include block data of the first transaction block 500. According to an embodiment, the first block information 503 may include unique identification data of the first transaction block 500. For example, the first block information 503 may include first block information BLK1_H of the first transaction block 500.

According to an embodiment, the first signature information 504 may include various pieces of signature information about the first transaction block 500. For example, the first signature information 504 may include signature information (e.g., the signature information 340 in FIG. 3) of a blockchain node, which has agreed to generate the first transaction block 500, among blockchain nodes included in the blockchain network.

According to an embodiment, the first transaction block 500 may be a block generated in association with the first blockchain node (e.g., the electronic device 100) and a second blockchain node (e.g., the first external device). For example, the first transaction block 500 may be a block generated by a consensus between the first blockchain node and the second blockchain node. Therefore, the first transaction block 500 may include information about the first blockchain node and the second blockchain node as the first signature information 504. For example, the first signature information 504 may include a public key of the first blockchain node and a public key of the second blockchain node.

According to an embodiment, the first signature information 504 may include signature data generated by signing the first block information 503 by means of a private key of a device participating in a consensus on the first transaction block 500. For example, the first signature information 504 may include signature data 504_1, generated by signing the first block information 503 by means of a private key of the first blockchain node (e.g., the private key of the electronic device 100), and signature data 504_2, generated by signing the first block information 503 by means of a private key of the second blockchain node (e.g., the private key of the external device). According to an embodiment, including the signature data, generated by signing the first block information 503 by means of the private key of the device participating in the consensus on the first transaction block 500, may guarantee that the first transaction block 500 is a block generated by the consensus between the first blockchain node and the second blockchain node.

According to an embodiment, the first blockchain node may generate a first ending block 510 in response to the generation of the first transaction block 500. For example, in response to the generation of the first transaction block 500, the processor 130 may generate the first ending block 510 as a block chained to the first transaction block 500.

According to an embodiment, the first ending block 510 may include a first ending hash value 511 and first ending signature data 512.

According to an embodiment, the first blockchain node may generate the first ending hash value 511, based on the first block information 503. For example, the first blockchain node may generate the first ending hash value 511 by adding additional information to the first block information 503 and hashing the same. According to various embodiments, the additional information may include various types of information. For example, the public key of the first blockchain node may be included.

According to an embodiment, the first blockchain node may generate the first ending signature data 512 by signing the first ending hash value 511 by means of a private key of the first blockchain node. In an embodiment, the validity of the first ending signature data 512, generated by signing using the private key of the first blockchain node, may be determined based on the public key of the first blockchain node.

According to an embodiment, the first blockchain node may receive a second ending block 520 from the second blockchain node participating in the consensus on the first transaction block 500. According to an embodiment, the second ending block 520 may include a first ending hash value 521 and second ending signature data 522.

According to an embodiment, in response to the generation of the first transaction block 500, the second blockchain node may generate the first ending hash value 521, based on the first block information 503. For example, the second blockchain node may generate the first ending hash value 521 by adding additional information to the first block information 503 and hashing the same. According to an embodiment, the first ending hash value 511 of the first ending block 510 and the first ending hash value 521 of the second ending block 520 may represent the same value.

According to an embodiment, the second blockchain node may generate the second ending signature data 522 by signing the first ending hash value 521 by means of a private key of the second blockchain node. In an embodiment, the validity of the second ending signature data 522, generated by signing using the private key of the second blockchain node, may be determined based on the public key of the second blockchain node.

According to an embodiment, the second blockchain node may transmit the generated second ending block 520 to the first blockchain node, and may receive the first ending block 510 from the first blockchain node.

In an embodiment, the first blockchain node may store the acquired second ending block 520 in the memory 110 as an ending block chained to the first transaction block 500. In an embodiment, the second blockchain node may store the acquired first ending block 510 in a memory included in the second blockchain node.

According to various embodiments, when another blockchain node (e.g., a third blockchain node) participates in the consensus on the first transaction block 500, the third blockchain node may perform an operation similar to that of the second blockchain node to generate a third ending block (not shown). Furthermore, each of the first to third blockchain nodes may store the first ending block 510, the second ending block 520, and the third ending block (not shown).

According to various embodiments, the blockchain nodes included in the blockchain network may use ending blocks (e.g., the first ending block 510 and the second ending block 520) to verify whether partial ledgers stored in the respective memories of the blockchain nodes have been forged or altered. Furthermore, when block recovery is needed due to forgery or alteration of the partial ledger stored in the memory of each of the blockchain nodes, a forged block may be recovered by an ending block.

Figure 6:
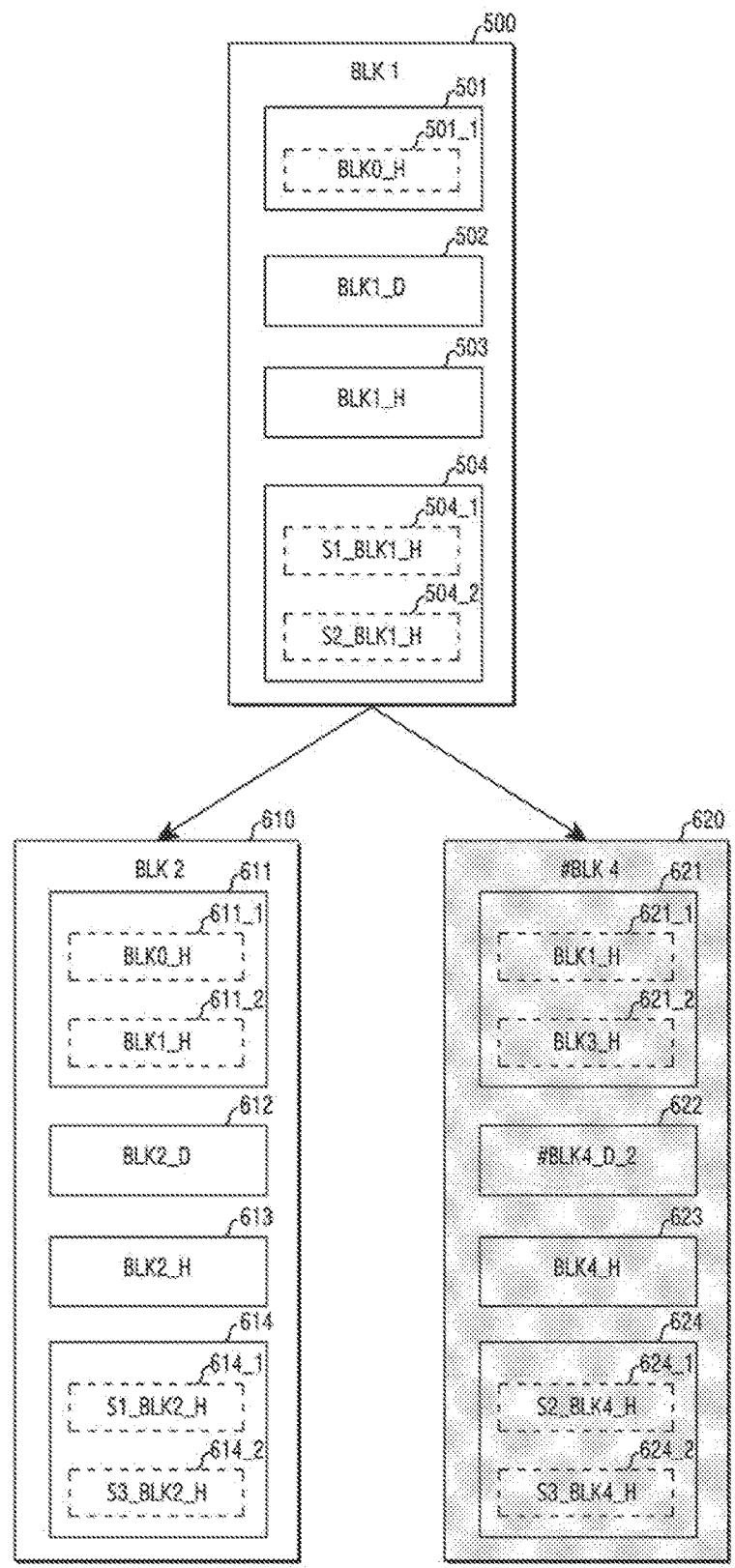
FIG. 6 illustrates replacement of an ending block and addition of an encrypted transaction block according to an embodiment.

FIG. 6 illustrates replacement of an ending block and addition of an encrypted transaction block according to an embodiment.

Referring to FIG. 6, the first transaction block 500, a second transaction block 610, and an encrypted fourth transaction block 620 are illustrated. Hereinafter, a description similar to or overlapping with the description made with reference to FIG. 5 may be omitted. For example, a description of the first transaction block 500, made with reference to FIG. 5, may be omitted.

According to an embodiment, the second transaction block 610 may indicate a block generated based on a second transaction generated in a blockchain network. According to an embodiment, the second transaction block 610 may be generated based on a consensus between a first blockchain node (e.g., the electronic device 100) and a third blockchain node (e.g., the second external device).

According to an embodiment, in response to the generation of the second transaction block 610, the first blockchain node (e.g., the electronic device 100) described with reference to FIG. 5 may store the second transaction block 610 in the memory 110 as an ending block in the blockchain 221 of the partial ledger 220

According to an embodiment, the second transaction block 610 may include second previous block information 611, second block data 612, second block information 613, and/or second signature information 614. The second previous block information 611 may be similar to the previous block information 310. The second block data 612 may be similar to the block data 320. The second block information 613 may be similar to the current block information 330. Furthermore, the second signature information 614 may be similar to the signature information 340.

In an embodiment, the second previous block information 611 may include previous block information in a full ledger included in a blockchain network. For example, the second previous block information 611 may include information about the first transaction block 500, which is a previous block in the full ledger included in the blockchain network. For example, the second previous block information 611 may include first block information 611_2 of the first transaction block 500. According to an embodiment, the first block information 503 of the first transaction block 500 and the first block information 611_2 of the second transaction block 610 may represent the same value. Therefore, the first transaction block 500 and the second transaction block 610 may be linked to each other based on the first block information 611_2. For example, the first block information 611_2 of the second transaction block 610 may be used to determine that a block generated before the second transaction block 610 is the first transaction block 500.

In an embodiment, the second previous block information 611 may include previous block information in a partial ledger. For example, the second previous block information 611 may include information about an initial block, which is a previous block in a partial ledger stored in the third blockchain node. For example, the second previous block information 611 may include identification data of an initial block (e.g., the initial block 410 in FIG. 4). For example, the second previous block information 611 may include a hash value of the initial block as initial block information 611_1. Therefore, in the partial ledger stored in the third blockchain node, the initial block and the second transaction block 610 may be linked based on the initial block information 611_1.

According to an embodiment, the second signature information 614 may include various types of signature information of the second transaction block 610. For example, the second signature information 614 may include signature information about a device, which has agreed to generate the second transaction block 610, among blockchain nodes included in the blockchain network.

According to an embodiment, the second transaction block 610 may include information about the first blockchain node and the third blockchain node as the second signature information 614. For example, the second signature information 614 may include a public key of the first blockchain node and a public key of the third blockchain node.

According to an embodiment, the second signature information 614 may include signature data generated by signing the second block information 613 by means of a private key of a device participating in a consensus on the second transaction block 610. For example, the second signature information 614 may include signature data 614_1, generated by signing the second block information 613 by means of a private key of the first blockchain node (e.g., the private key of the electronic device 100), and signature data 614_2, generated by signing the second block information 613 by means of a private key of the third blockchain node (e.g., a private key of the second external device).

According to an embodiment, in generating the second transaction block 610, the first blockchain node may verify the first ending block 510 and the second ending block 520 for the first transaction block 500. According to an embodiment, when the verification of the first ending block 510 and the second ending block 520 is successful, the first blockchain node may replace the first ending block 510 with the second transaction block 610. Therefore, the first ending block 510 may be deleted from the memory 110, and the second transaction block 610 may be stored.

According to an embodiment, the first blockchain node may receive an encrypted transaction block when a second blockchain node participating in the consensus on the first transaction block 500 participates in a consensus on a new transaction block.

According to an embodiment, the second blockchain node may participate in consensus on a fourth transaction block after the generation of the first transaction block 500. Therefore, when the fourth transaction block is generated, a last block included in a partial ledger of the second blockchain node may be the fourth transaction block.

According to an embodiment, the fourth transaction block may be generated based on a consensus performed by the second blockchain node and the third blockchain node. The fourth transaction block may have a structure similar to that of the first transaction block 500. According to an embodiment, when the fourth transaction block is generated, the second blockchain node may transmit the encrypted fourth transaction block to the first blockchain node. For example, the second blockchain node may encrypt fourth block data included in the fourth transaction block, and may generate the encrypted fourth transaction block 620 including the encrypted fourth block data 622. The second blockchain node may transmit the encrypted fourth transaction block 620 to the first blockchain node. According to an embodiment, the second blockchain node may encrypt the fourth block data by using a public key of the second blockchain node so that the fourth block data may be decrypted only by using a private key of the second blockchain node.

According to an embodiment, the first blockchain node may acquire the encrypted fourth transaction block 620 from the second blockchain node to replace the second ending block 520, which is an ending block for the second blockchain node, with the encrypted fourth transaction block 620. For example, the first blockchain node may delete the second ending block 520 from the memory 110. Furthermore, the first blockchain node may store the encrypted fourth transaction block 620 in the memory 110 as a block for the first transaction block 500.

The encrypted fourth transaction block 620 may have a structure similar to that of the transaction block 300, except for the encrypted fourth block data 622. For example, the encrypted fourth transaction block 620 may include fourth previous block information 621, fourth block information 623, and/or the fourth signature information 624.

In an embodiment, the fourth previous block information 621 may include previous block information in a full ledger included in the blockchain network. For example, the fourth previous block information 621 may include information about third transaction block (not shown), which is a previous block in the full ledger included in the blockchain network. For example, the fourth previous block information 621 may include third block information 621_2 of the third transaction block. According to an embodiment, the third transaction block and the fourth transaction block 620 may be linked based on the third block information 621_2 of the third transaction block.

In an embodiment, the fourth previous block information 621 may include previous block information in a partial ledger. For example, the fourth previous block information 621 may include information about the first transaction block 500, which is a previous block in a partial ledger stored in the first blockchain node. For example, the fourth previous block information 621 may include a hash value of the transaction block as first block information 621_1 of the first transaction block 500. Therefore, in the partial ledger stored in the first blockchain node, the first transaction block 500 and a fourth transaction block (not shown) may be linked based on the first block information 621_1.

According to an embodiment, the fourth signature information 624 may include various types of signature information of the fourth transaction block 620. For example, the fourth signature information 624 may include signature information of a device, which has agreed to generate the fourth transaction block 620, among blockchain nodes included in the blockchain network. For example, the fourth signature information 624 may include signature data 624_1, generated by signing the fourth block information 623 by means of the private key of the second blockchain node, and signature data 624_2, generated by signing the fourth block information 623 by means of the private key of the third blockchain node.

According to an embodiment, when the second ending block 520 is replaced with the encrypted fourth transaction block 620, the first blockchain node may determine that the last block stored in the partial ledger of the second blockchain node is not the first transaction block. Furthermore, blockchain nodes included in the blockchain network may verify, based on the encrypted fourth transaction block 620, forgery and alteration of the partial ledger stored in a memory of each of the second blockchain node and/or the third blockchain node.

Figure 7:
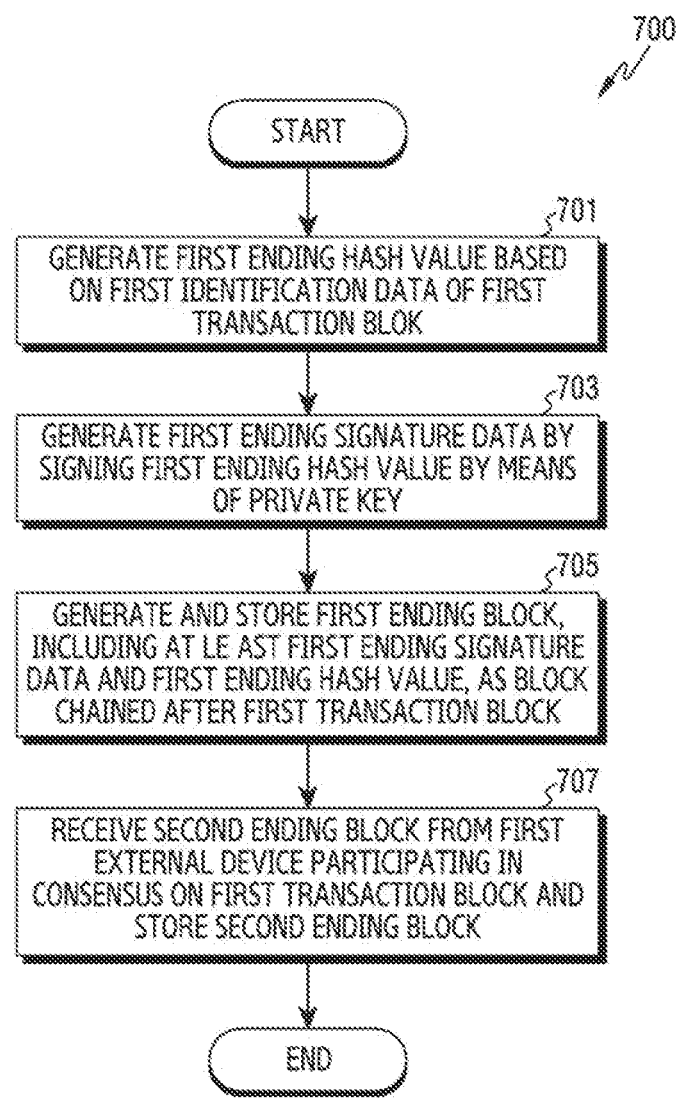
FIG. 7 is a flowchart illustrating an operation of generating an ending block by an electronic device according to an embodiment.

FIG. 7 is a flowchart 700 illustrating an operation of generating an ending block by an electronic device according to an embodiment.

Referring to FIG. 7, in operation 701, the electronic device 100 (e.g., the first blockchain node described with reference to FIGS. 5 and 6) may generate a first ending hash value (e.g., the first ending hash value 511), based on first identification data (e.g., the first block information 503) of a first transaction block (e.g., the first transaction block 500 in FIG. 5). For example, in response to the generation of the first transaction block at the end of the blockchain 221 included in the partial ledger 220, the electronic device 100 may generate the first ending hash value, based on the first identification data of the first transaction block. For example, the electronic device 100 may generate the first ending hash value by hashing a hash value of a first block that is the first identification data of the first transaction block.

According to an embodiment, in operation 703, the electronic device 100 may generate a first ending signature data (e.g., the first ending signature data 512) by signing a first ending hash value by means of a private key. For example, the electronic device 100 may generate the first ending data by digitally signing the first ending hash value by means of a private key stored in the memory 110.

According to an embodiment, in operation 705, the electronic device 100 may store a first ending block (e.g., the first ending block 510), including at least the first ending data and the first ending hash value, as a block chained after the first transaction block. For example, the electronic device 100 may generate the first ending block including at least the first ending signature data and the first ending hash value. Furthermore, the generated first ending block may be stored in the memory 110 as a block for the first transaction block.

According to an embodiment, in operation 707, the electronic device 100 may receive a second ending block from an external device (e.g., the second blockchain node described with reference to FIGS. 5 and 6) participating in a consensus on the first transaction block and may store the second ending block. For example, the electronic device 100 may receive, through the communication circuit 120, the second ending block (e.g., the second ending block 520) from the external device (e.g., the second blockchain node described with reference to FIG. 5) participating in the consensus on the first transaction block. Furthermore, the electronic device 100 may store the received second ending block in the memory 110. In an embodiment, the second ending block may include the first ending hash value and a second ending signature data generated by signing the first ending hash value by means of a private key of the first external device. In an embodiment, the electronic device 100 may store the second ending block in the memory as a chained block of the first transaction block. For example, the electronic device 100 may store the second ending block as a block for the first transaction block together with the first ending block.

Figure 8:
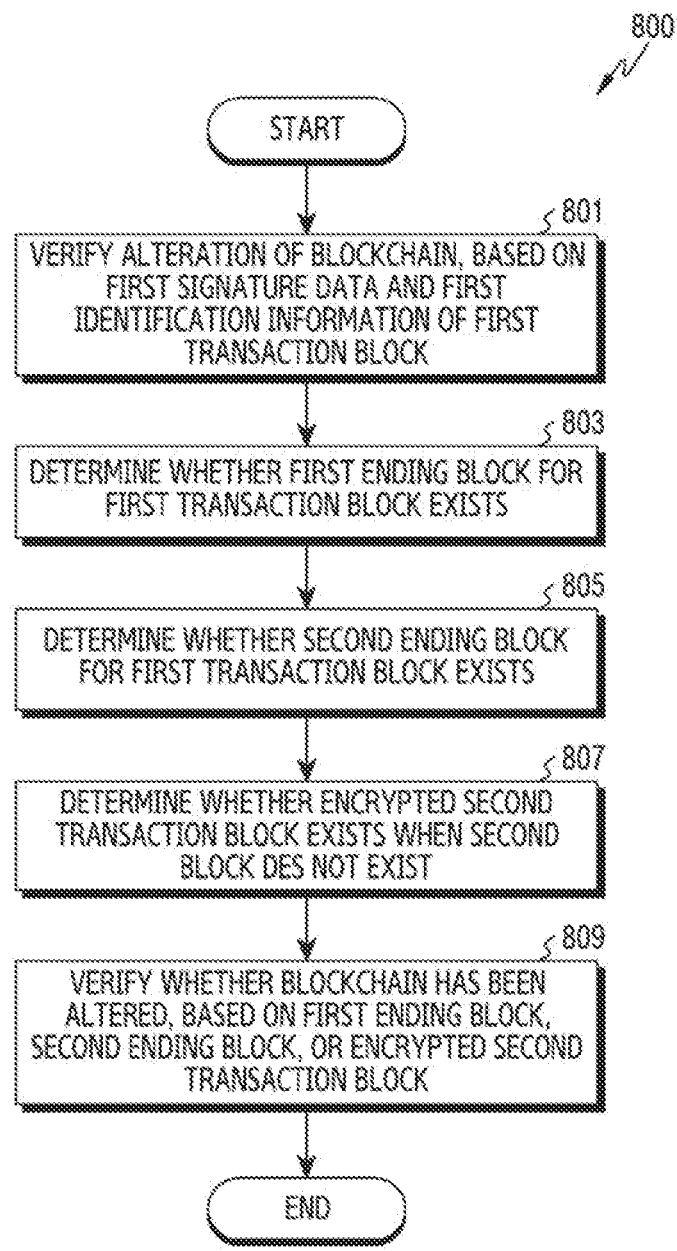
FIG. 8 is a flowchart illustrating an operation of verifying whether a block has been altered, based on an ending block, by an electronic device according to an embodiment.

FIG. 8 is a flowchart 800 illustrating an operation of verifying whether a block has been altered, based on an ending block, by an electronic device according to an embodiment.

Referring to FIG. 8, in operation 801, the electronic device 100 (e.g., the first blockchain node described with reference to FIGS. 5 and 6) may verify whether a blockchain has been altered, based on first signature data (e.g., the first signature information 504) and first identification information (e.g., the first block information 503) of a first transaction block (e.g., the first transaction block 500). For example, the electronic device 100 may verify whether the blockchain has been altered or not, based on the first signature data and the first identification data of the first transaction block at the end of the blockchain 221 included in the partial ledger 220. For example, the electronic device 100 may verify, based on first signature information (e.g., the signature data 504_1) signed using a private key of the electronic device 100 included in the first signature data, that the first transaction block is a block generated by participation of the electronic device 100 in consensus. Furthermore, the electronic device 100 may verify that the first transaction block has not been altered, based on signature data (e.g., the signature data 504_2) signed using a private key of at least one external device (e.g., the second blockchain node described with reference to FIG. 5) participating in a consensus on the first transaction block, included in the first signature data.

According to an embodiment, in operation 803, the electronic device 100 may determine whether a first ending block (e.g., the first ending block 510) for the first transaction block exists. For example, the electronic device 100 may determine whether the first ending block for the first transaction block exists in the partial ledger 220. According to an embodiment, the first ending block may include a first ending hash value (e.g., the first ending hash value 511) generated based on the first identification data, and a first ending data (e.g., the first ending signature data 512) generated by signing the first ending hash value and a private key stored in the memory 110.

According to an embodiment, in operation 805, the electronic device 100 may determine whether a second ending block (e.g., the second ending block 520) for the first transaction block exists. For example, the electronic device 100 may determine whether the second ending block for the first transaction block exists in the partial ledger 220. According to an embodiment, the second ending block may include the first ending hash value (e.g., the first ending hash value 521) and a second ending signature data (e.g., the second ending signature data 522) generated by signing the first ending hash value by means of a private key of an external device participating in a consensus on the first transaction block.

According to an embodiment, when the first ending block and the second ending block exist in the partial ledger 220, the electronic device 100 may verify that the first ending block and the second ending block are blocks legally generated based on the first ending data and the second ending signature data, respectively.

According to an embodiment, in operation 807, when the second ending block does not exist, the electronic device 100 may determine whether an encrypted second transaction block (e.g., the encrypted fourth transaction block 620 in FIG. 5) exists. For example, the electronic device 100 may determine whether an encrypted transaction block for the first transaction block, which is the last transaction block included in the blockchain 221, exists.

According to an embodiment, in operation 809, the electronic device 100 may verify alteration of the blockchain, based on the first ending block, the second ending block, or the encrypted second transaction block.

According to an embodiment, when the first ending block does not exist, the electronic device 100 may determine that the first transaction block is not the last transaction block of the blockchain 221 and the blockchain 221 has been altered. According to an embodiment, when the first ending block does not exist, the electronic device 100 may recover an altered block with reference to the external device participating in the consensus on the first transaction block. For example, the electronic device 100 may refer to an ending block related to the electronic device 100 that is stored in the external device participating in the consensus on the first transaction block.

According to an embodiment, when the second ending block does not exist, the electronic device 100 may determine whether the encrypted second transaction block exists. According to an embodiment, when neither the second ending block nor the encrypted second transaction block exists, the electronic device 100 may determine that the blockchain 221 has been altered. According to an embodiment, when neither the second ending block nor the encrypted second transaction block exists, the electronic device 100 may recover an altered block with reference to the external device participating in the consensus on the first transaction block. For example, the electronic device 100 may refer to an ending block related to the electronic device 100 that is stored in the external device participating in the consensus on the first transaction block.

Figure 9A:
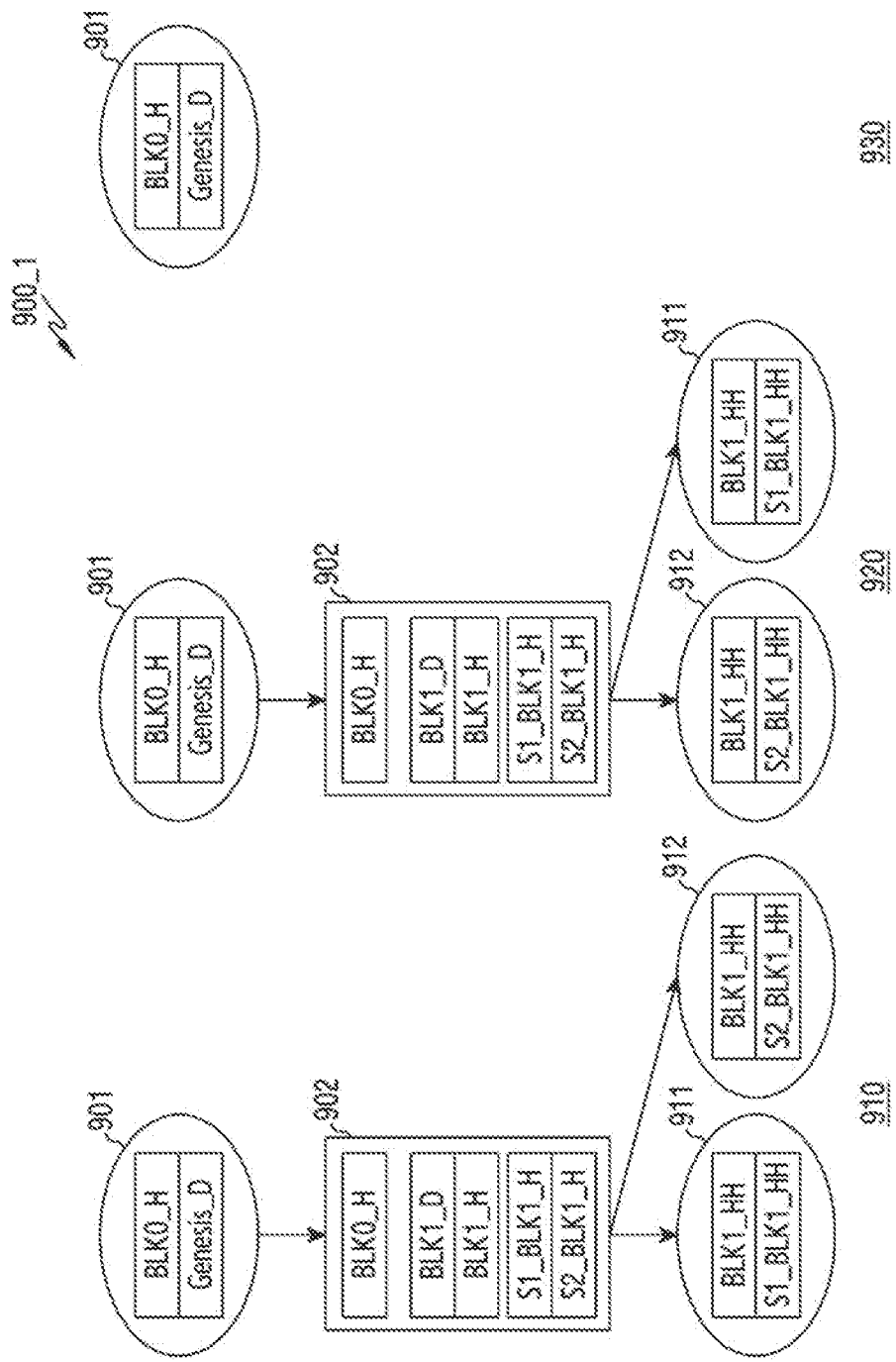
FIG. 9A illustrates generation of a first transaction block in a blockchain network according to an embodiment.
Figure 9B:
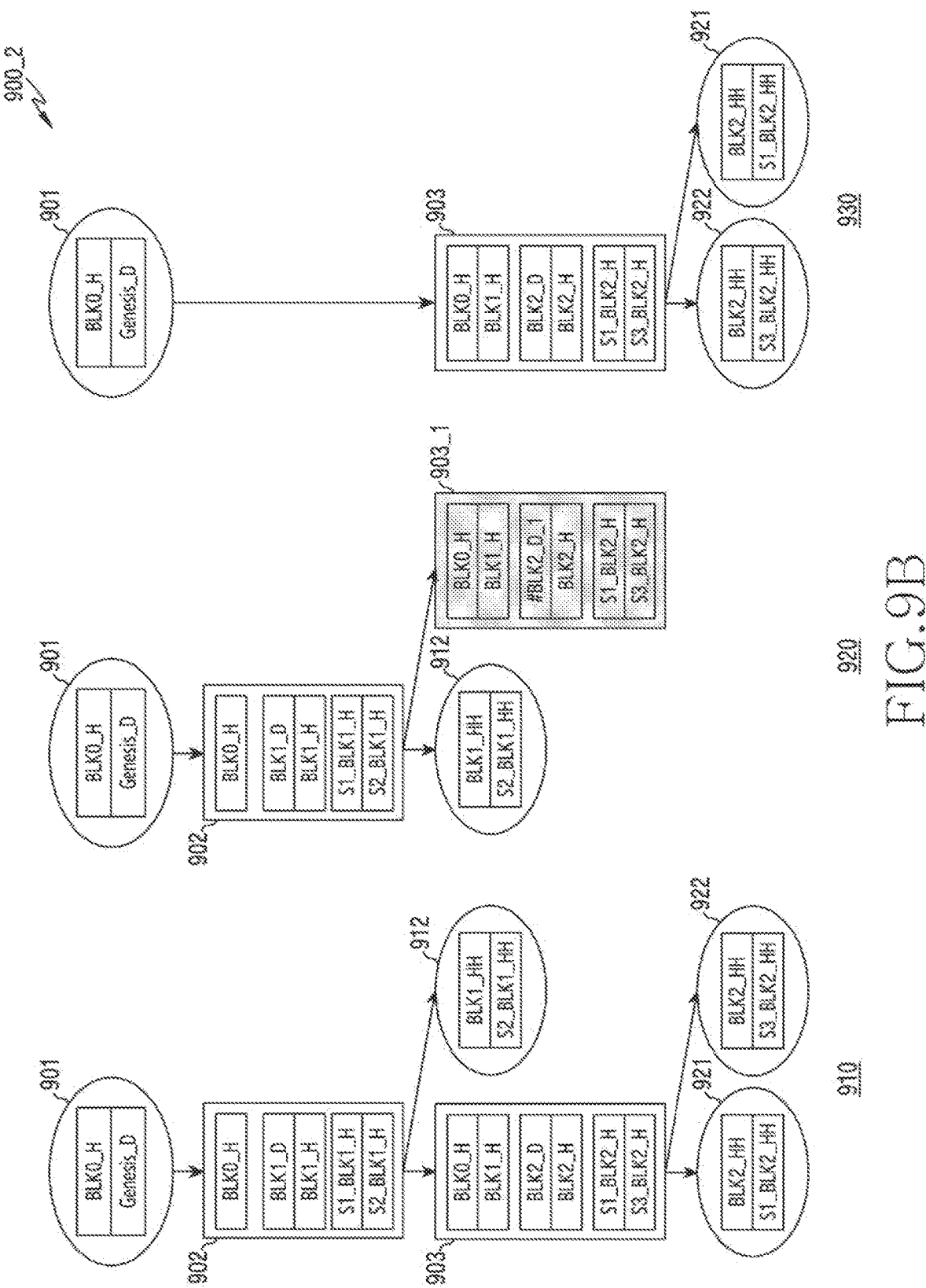
FIG. 9B illustrates generation of a second transaction block in a blockchain network according to an embodiment.
Figure 9C:
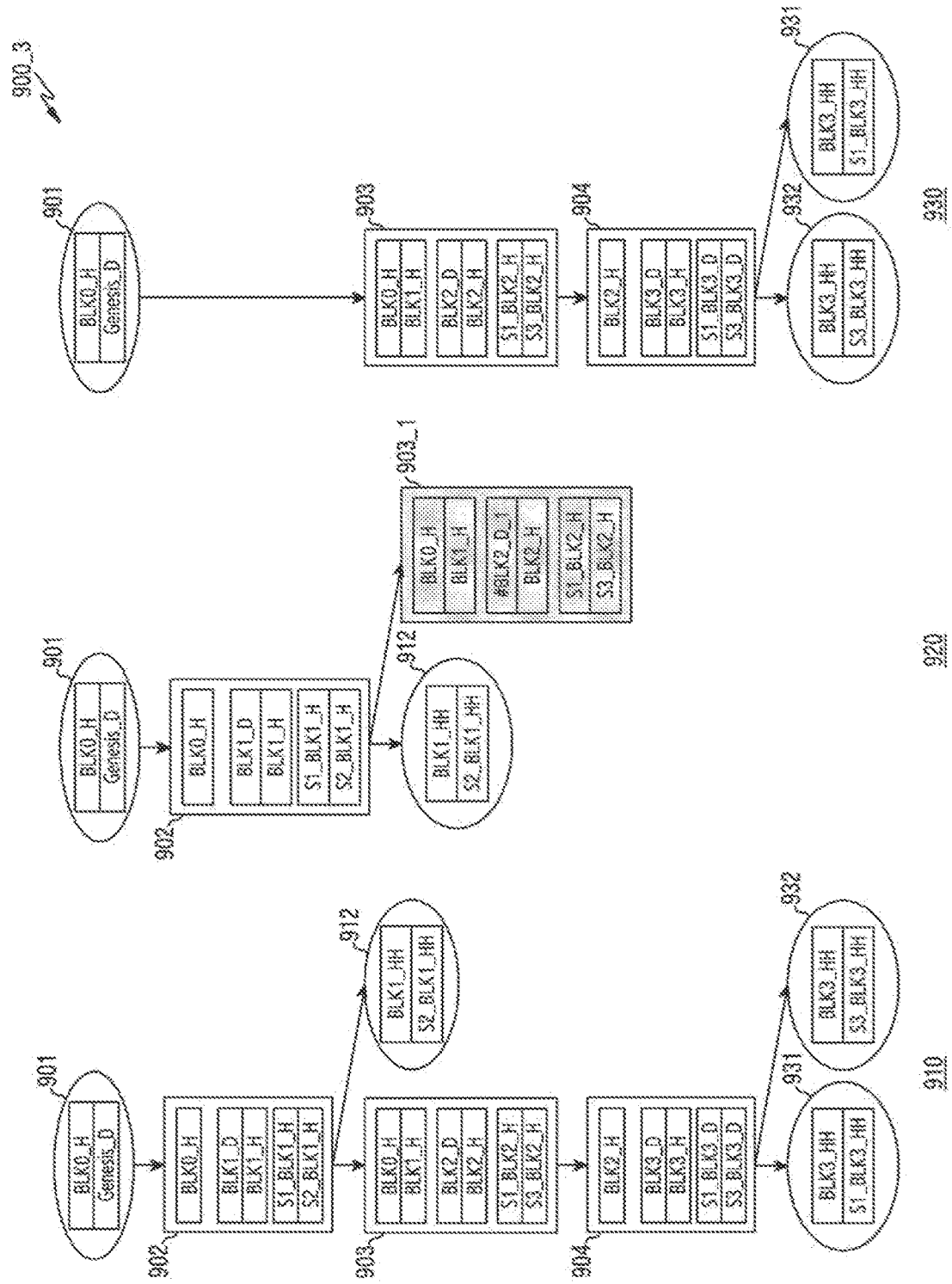
FIG. 9C illustrates generation of a third transaction block in a blockchain network according to an embodiment.
Figure 9D:
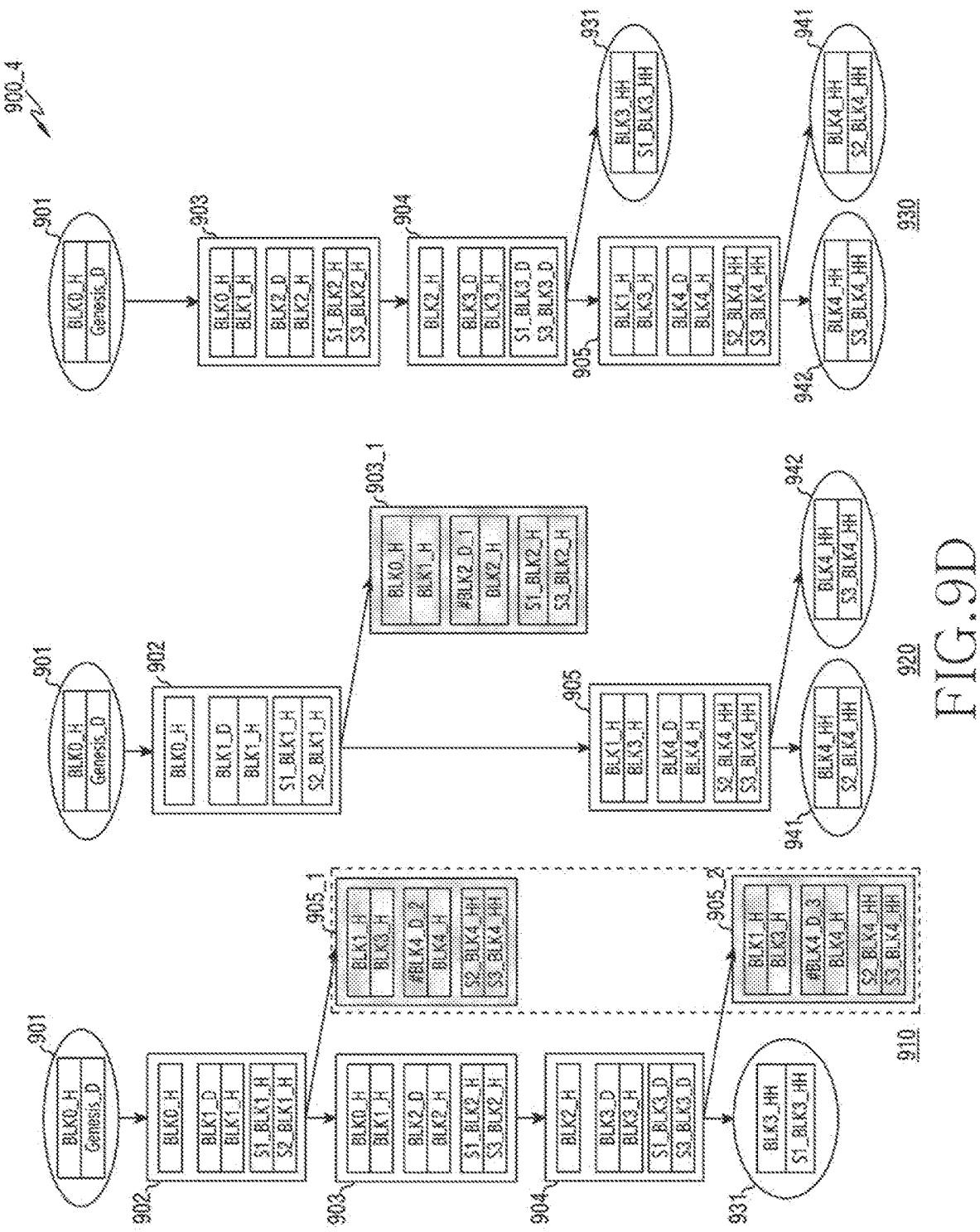
FIG. 9D illustrates generation of a fourth transaction block in a blockchain network according to an embodiment.

FIG. 9A illustrates generation of a first transaction block in a blockchain network according to an embodiment. FIG. 9B illustrates generation of a second transaction block in a blockchain network according to an embodiment. FIG. 9C illustrates generation of a third transaction block in a blockchain network according to an embodiment. FIG. 9D illustrates generation of a fourth transaction block in a blockchain network according to an embodiment.

Referring to FIGS. 9A to 9D, a partial ledger stored in each of a first blockchain node (e.g., the electronic device 100), a second blockchain node (e.g., the external device described with reference to FIGS. 5 and 6), and a third blockchain node (e.g., the second external device with reference to FIGS. 5 and 6) is illustrated. The structure of a transaction block, included in FIGS. 9A to 9D, may be similar to the structure of each of the transaction block (e.g., the transaction block 300 or the first transaction block 500) described with reference to FIGS. 3 to 6. Furthermore, the structure of an ending block, included in FIGS. 9A to 9D, may be similar to the structure of the ending block (e.g., the first ending block 510 or the second ending block 520) described with reference to FIGS. 5 and 6. Furthermore, the structure of an encrypted transaction block, included in FIGS. 9A to 9D, may be similar to the structure of the encrypted fourth transaction block 620 described with reference to FIG. 6. Therefore, contents similar to or overlapping those described with reference to FIGS. 3 to 6 may be omitted.

According to an embodiment, each of the first blockchain node to the third blockchain node may store, in a memory thereof, a partial ledger including a part of a distributed ledger of a blockchain network. For example, the first blockchain node may include a first partial ledger 910. Furthermore, the second blockchain node may include a second partial ledger 920, and the third blockchain node may include a third partial ledger 930. According to an embodiment, the first partial ledger 910, the second partial ledger 920, and the third partial ledger 930 may be updated when a new block is generated through the first to third blockchain nodes included in the blockchain network.

Referring to FIG. 9A, a first state 900_1 of each of partial ledgers according to generation of a first transaction block 902 is illustrated. According to an embodiment, when a blockchain network is generated, an initial block 901 may be generated. According to an embodiment, the initial block 901 may indicate a genesis block related to the generation of the blockchain network. According to an embodiment, the initial block 901 may include initial block information BLK0_H and initial block data Genesis_D. According to an embodiment, each of the first partial ledger 910, the second partial ledger 920, and the third partial ledger 930 may include the initial block 901.

According to an embodiment, the first transaction block 902 may be generated based on the consensus between the first blockchain node and the second blockchain node. When the first transaction block 902 is generated, each of the first partial ledger 910 and the second partial ledger 920 may include the first transaction block 902 which is a block chained to the initial block 901.

According to an embodiment, the first transaction block 902 may have a structure that is similar to that of the first transaction block 500 described with reference to FIG. 6. Therefore, the first transaction block 902 may include first signature information, and the first signature information may include signature data S1_BLK1_H, generated by signing the first block information BLK1_H by means of a private key of the first blockchain node (e.g., the private key of the electronic device 100), and signature data S2_BLK1_H, generated by signing the first block information BLK1_H by means of a private key of the second blockchain node (e.g., the private key of the external device). Furthermore, the first transaction block 902 may include first previous block information including the initial block information BLK0_H of the initial block 901, which is the previous block of the first transaction block 902.

According to an embodiment, when the first transaction block 902 is generated, the first blockchain node and the second blockchain node may generate a first ending block 911 (e.g., the first ending block 510 in FIG. 5) and a second ending block 912 (e.g., the second ending block 520 in FIG. 5), respectively.

For example, the first blockchain node may generate a first ending hash value BLK1_HH by adding additional information to the first block information BLK1_H of the first transaction block 902 and hashing the same. Furthermore, the first blockchain node may generate first ending signature data S1_BLK1_HH by signing the first ending hash value BLK1_HH by means of the private key of the first blockchain node. The first blockchain node may generate the first ending block 911 including at least the first ending hash value BLK1_HH and the first ending signature data S1_BLK1_HH.

Furthermore, for example, the second blockchain node may generate a second ending hash value BLK1_HH by adding additional information to the first block information BLK1_H of the first transaction block 902 and hashing the same. Furthermore, the second blockchain node may generate second ending signature data S2_BLK1_HH by signing the second ending hash value BLK1_HH by means of the private key of the second blockchain node. The second blockchain node may generate the second ending block 912 including at least the second ending hash value BLK1_HH and the second ending signature data S2_BLK1_HH.

According to an embodiment, the first ending hash value BLK1_HH and the second ending hash value BLK1_HH may have an identical value.

According to an embodiment, the first blockchain node may transmit information about the generated first ending block 911 to the second blockchain node. Furthermore, the second blockchain node may transmit information about the generated second ending block 912 to the first blockchain node. Therefore, the first blockchain node may store the first ending block 911 and the second ending block 912, which have been acquired, in the memory thereof as blocks chained to the first transaction block 902. Therefore, the first partial ledger 910 may include the first ending block 911 and the second ending block 912 as blocks chained to the first transaction block 902. In a similar way, the second partial ledger 920 may include the first ending block 911 and the second ending block 912 as blocks chained to the first transaction block 902. Hereinafter, the first ending block 911 and the second ending block 912 may be referred to as ending blocks for the first transaction block 902 or ending blocks linked to the first transaction block 902.

According to an embodiment, the blockchain nodes included in the blockchain network may verify, based on the first ending block 911 and the second ending block 912, that the first transaction block 902 is a block when each of the first blockchain node and the second blockchain node has finally participated in a consensus. That is, the blockchain nodes included in the blockchain network may verify, based on the first ending block 911 and the second ending block 912, that the first transaction block 902 is the last block in each of the first partial ledger 910 and the second partial ledger 920. Therefore, even when an ending block of a blockchain included in the partial ledger of each of the blockchain nodes has been forged or altered, the blockchain nodes may determine, based on the ending block, whether the forgery or alteration has been made.

Referring to FIG. 9B, a second state 900_2 of each of partial ledgers according to generation of a second transaction block 903 is illustrated. According to an embodiment, the first to third partial ledgers 910, 920, and 930 included in the respective blockchain nodes may be updated when the second transaction block 903 is generated in the first state 900_1 of the partial ledgers.

According to an embodiment, the first blockchain node and the third blockchain node may participate in a consensus on the second transaction block 903. According to an embodiment, in response to a request for generation of the second transaction block 903, the blockchain nodes included in the blockchain network may verify whether the first to third partial ledgers 910, 920, and 930 have been forged or altered.

According to an embodiment, in response to a request for the second transaction block 903, the first blockchain node may verify whether the first transaction block 902 is a forged or altered block, based on the first block information BLK1_H and the first signature information S1_BLK1_H and S2_BLK1_H. According to an embodiment, the first blockchain node may verify the first transaction block 902, based on the first signature information S1_BLK1_H and S2_BLK1_H, which is data signed using the private keys of the first blockchain node and the second blockchain node. For example, the first blockchain node may verify that the first transaction block 902 is a block generated based on the consensus between the first blockchain node and the second blockchain node, and may verify whether the first transaction block 902 has been forged or altered.

According to an embodiment, in response to a request for generation of the second transaction block 903, the blockchain nodes included in the blockchain network may verify whether the first to third partial ledgers 910, 920, and 930 have been altered. According to an embodiment, the first blockchain node may verify an ending block of the first partial ledger 910. For example, the first blockchain node may verify whether an ending block for a last transaction block exists in the first partial ledger 910. For example, the first blockchain node may verify whether the first ending block 911 and the second ending block 912 exist. When the first ending block 911 and the second ending block 912 exist, the first blockchain node may verify that the first partial ledger 910 has not been altered. For example, when the first ending block 911 and the second ending block 912 exist, it may be determined that an ending block included in a blockchain of the first partial ledger 910 has not been forged or altered.

According to an embodiment, when the ending block for the last transaction block does not exist, the first blockchain node may determine that the first partial ledger 910 has been altered. Based on the result of the determination, the first blockchain node may recover the ending block with reference to a blockchain node participating in a consensus on the last transaction block. For example, when the first ending block 911 or the second ending block 912 does not exist, the first blockchain node may refer to the second partial ledger 920 of the second blockchain node through the first transaction block 902. In an embodiment, when the first ending block 911 or the second ending block 912 does not exist, the first blockchain node may recover the first ending block 911 or the second ending block 912 with reference to the second partial ledger 920.

Hereinafter, based on a request for a new transaction block, each of the first to third blockchain nodes may perform a similar operation to verify an ending block.

According to an embodiment, when the second transaction block 903 is generated, the first blockchain node may replace the first ending block 911 with the second transaction block 903. For example, the first blockchain node may delete the first ending block 911 from the first partial ledger 910, and may add the second transaction block 903 as a chained block of the first transaction block 902.

According to an embodiment, when the second transaction block 903 is generated, the first blockchain node may generate a third ending block 921 for the second transaction block 903. For example, the first blockchain node may perform an operation similar to the generation of the first ending block 911 to generate the third ending block 921. For example, the first blockchain node may generate a third ending hash value BLK2_HH by adding additional information to second block information BLK2_H, which is information about the second transaction block, and hashing the same. Furthermore, the first blockchain node may generate third ending signature data S1_BLK2_HH by signing the third ending hash value BLK2_HH by means of a private key of the first blockchain node. The first blockchain node may generate the third ending block 921 including the third ending hash value BLK2_HH and the third ending signature data S1_BLK2_HH, and may add the third ending block 921 to the first partial ledger 910 as an ending block for the second transaction block 903. According to an embodiment, the first blockchain node may transmit the third ending block 921 to the third blockchain node, and may acquire a fourth ending block 922 from the third blockchain node. The first blockchain node may add the acquired fourth ending block 922 to the first partial ledger 910 as an ending block for the second transaction block 903.

According to an embodiment, when the second transaction block 903 is generated, the third blockchain node may generate the fourth ending block 922 for the second transaction block 903. The third blockchain node may perform an operation similar to that of the first blockchain node to generate the fourth ending block 922. According to an embodiment, the third blockchain node may add the generated fourth ending block 922 to the third partial ledger 930 as an ending block for the second transaction block 903. According to an embodiment, the third blockchain node may transmit the fourth ending block 922 to the first blockchain node, and may acquire the third ending block 921 from the first blockchain node. The third blockchain node may add the acquired third ending block 921 to the third partial ledger 930 as an ending block for the second transaction block 903.

Hereinafter, an operation of generating an ending block in response to generation of a new transaction block may be performed similarly to the above-mentioned operation. Therefore, a description of an operation in which each of the blockchain nodes replaces an ending block for an ending transaction block of the blockchain with the new transaction block and generates an ending block for the new transaction block may be omitted below.

According to an embodiment, when the second transaction block 903 is generated, the second blockchain node may replace the first ending block 911 for the first blockchain node with an encrypted second transaction block 903_1. According to an embodiment, when the first ending block 911 is replaced with the second transaction block 903, the first blockchain node may generate the encrypted second transaction block 903_1. For example, the first blockchain node may encrypt second block data BLK2_D in the second transaction block 903 by using a public key of the first blockchain node. Furthermore, the first blockchain node may transmit the encrypted second transaction block 903_1 including encrypted second block data #BLK2_D_1 to the second blockchain node.

According to an embodiment, when the encrypted second transaction block 903_1 is received from the first blockchain node, the second blockchain node may replace the first ending block 911, which is an ending block related to the first blockchain node, with the encrypted second transaction block 903_1. Therefore, the first ending block 911 included in the second partial ledger 920 may be deleted, and the encrypted second transaction block 903_1 may be added as a block for the first transaction block 902. The second blockchain node according to an embodiment may determine, based on the encrypted second transaction block 903_1, that an ending transaction block included in the first blockchain node is the second transaction block 903.

Hereinafter, an operation in which, in response to generation of a new transaction block in a blockchain network, an encrypted transaction block is added to a partial ledger of a blockchain node that does not participate in a consensus on the new transaction block may be similar to the operation in which the encrypted second transaction block 903_1 is generated.

Referring to FIG. 9C, a third state 900_3 of the partial ledgers according to generation of a third transaction block 904 is illustrated. According to an embodiment, the first to third partial ledgers 910, 920, and 930 included in the respective blockchain nodes may be updated from the second state 900_2 of the partial ledgers when the third transaction block 904 is generated.

According to an embodiment, the first blockchain node and the third blockchain node may participate in a consensus on the third transaction block 904. According to an embodiment, in response to a request for generation of the third transaction block 904, the blockchain nodes included in the blockchain network may verify whether the first to third partial ledgers 910, 920, and 930 have been forged or altered.

According to an embodiment, in response to a request for the third transaction block 904, the first blockchain node may verify whether the second transaction block 903 is a forged or altered block, based on the second block information BLK2_H and second signature information S1_BLK2_H and S3_BLK2_H. According to an embodiment, the first blockchain node may verify the second transaction block 903, based on the second signature information S1_BLK2_H and S3_BLK2_H which is data signed using the private keys of the first blockchain node and the third blockchain node. For example, the first blockchain node may verify that the second transaction block 903 is a block generated based on the consensus between the first blockchain node and the third blockchain node, and may verify whether the second transaction block 903 has been forged or altered.

According to an embodiment, in response to a request for the generation of the third transaction block 904, the blockchain nodes included in the blockchain network may verify whether the first to third partial ledgers 910, 920, and 930 have been altered. According to an embodiment, the first blockchain node may verify an ending block of the first partial ledger 910. For example, the first blockchain node may verify whether the third ending block 921 and the fourth ending block 922 for the second transaction block 903, which is the last transaction block, exist in the first partial ledger 910. When the third ending block 921 and the fourth ending block 922 exist the first partial ledger 910, the first blockchain node may determine that an ending block included in the blockchain of the first partial ledger 910 has not been altered.

According to an embodiment, when the third ending block 921 or the fourth ending block 922 does not exist, the first blockchain node may refer to the third partial ledger 930 of the third blockchain node through the second transaction block 903. In an embodiment, when the third ending block 921 or the fourth ending block 922 does not exist, the first blockchain node may recover the third ending block 921 or the fourth ending block 922 with reference to the third partial ledger 930.

Hereinafter, based on a request for a new transaction block, each of the first to third blockchain nodes may perform a similar operation to verify an ending block.

According to an embodiment, when the third transaction block 904 is generated, the first blockchain node may replace the third ending block 921 with the third transaction block 904. For example, the first blockchain node may delete the third ending block 921 from the first partial ledger 910, and may add the third transaction block 904 as a chained block of the second transaction block 903. At this time, the first blockchain node may determine that the fourth ending block 922 is an ending block generated from the third blockchain node. The first blockchain node may determine that the fourth ending block 922 has been generated from the third blockchain node participating in the consensus on the third transaction block 904, and may delete the fourth ending block 922 from the first partial ledger 910. Therefore, when there is an ending block (e.g., the fourth ending block 922) generated based on another blockchain node (e.g., the third blockchain node) among ending blocks (e.g., the third ending block 921 and the fourth ending block 922) for the last transaction block (e.g., the second transaction block 903) of the blockchain, and when the other blockchain node participates in a consensus of a generated transaction block (e.g., the third transaction block 904), the first blockchain node may delete all of the ending blocks, and may add the generated transaction block to the first partial ledger 910.

According to an embodiment, when the third transaction block 904 is generated, the first blockchain node may generate a fifth ending block 931 for the third transaction block 904. For example, the first blockchain node may generate the fifth ending block 931 by performing an operation similar to the generation of the first ending block 911 and the third ending block 921. For example, the first blockchain node may generate the fifth ending block 931 including a fifth ending hash value BLK3_HH and fifth ending signature data BLK3_HH, and may add the fifth ending block 931 to the first partial ledger 910 as an ending block for the third transaction block 904. According to an embodiment, the first blockchain node may transmit the fifth ending block 931 to the third blockchain node, and may acquire a sixth ending block 932 from the third blockchain node. The first blockchain node may add the acquired sixth ending block 932 to the first partial ledger 910 as an ending block for the third transaction block 904.

According to an embodiment, when the third transaction block 904 is generated, the third blockchain node may generate the sixth ending block 932 for the third transaction block 904. The third blockchain node may generate the sixth ending block 932 by performing an operation similar to that of the first blockchain node. According to an embodiment, the third blockchain node may add the generated sixth ending block 932 to the third partial ledger 930 as an ending block for the third transaction block 904. According to an embodiment, the third blockchain node may transmit the sixth ending block 932 to the first blockchain node, and may acquire the fifth ending block 931 from the first blockchain node. The third blockchain node may add the acquire fifth ending block 931 to the third partial ledger 930 as an ending block for the third transaction block 904.

Hereinafter, an operation of generating an ending block in response to generation of a new transaction block may be performed similarly to the above-mentioned operation. Therefore, a description of an operation in which each of the blockchain nodes replaces an existing ending block with a new transaction block and generates an ending block for the new transaction block will be omitted below. For example, the third blockchain node may update the third partial ledger 930 by performing an operation similar to that of the first blockchain node.

Referring to FIG. 9D, a fourth state 900_4 of the partial ledgers according to generation of a fourth transaction block 905 is illustrated. According to an embodiment, the first to third partial ledgers 910, 920, and 930 included in the respective blockchain nodes may be updated from the third state 900_3 of the partial ledgers when the fourth transaction block 905 is generated.

According to an embodiment, the fourth transaction block 905 may be generated based on the consensus between the second blockchain node and the third blockchain node. According to an embodiment, in response to a request for generation of the fourth transaction block 905, the blockchain nodes included in the blockchain network may verify whether the first to third partial ledgers 910, 920, and 930 have been altered.

According to an embodiment, in response to a request for the fourth transaction block 905, the second blockchain node may verify whether the first transaction block 902 is an altered block, based on the first block information BLK1_H and the first signature information S1_BLK1_H and S2_BLK1_H. According to an embodiment, the second blockchain node may verify that the first transaction block 902 has not been altered, based on the first signature information S1_BLK1_H and S2_BLK1_H which is data signed using private keys of the first blockchain node and the second blockchain node. For example, the second blockchain node may verify that the first transaction block 902 is a block generated based on the consensus between the first blockchain node and the second blockchain node, and may verify whether the first transaction block 902 has been forged or altered.

Similarly, in response to a request for the fourth transaction block 905, the third blockchain node may verify whether the third transaction block 904 is an altered block. For example, the third blockchain node may verify, based on third block information BLK3_H and third signature information S1_BLK3_H and S3_BLK3_H, whether the third transaction block 904 has been forged or altered. According to an embodiment, the third blockchain node may verify that the third transaction block 904 has not been altered, based on the third signature information S1_BLK3_H and S3_BLK3_H which is information signed using private keys of the first blockchain node and the third blockchain node. For example, the third blockchain node may verify that the third transaction block 904 is a block generated based on the consensus between the first blockchain node and the third blockchain node, and may verify whether the third transaction block 904 has been forged or altered.

According to an embodiment, in response to generation of a new transaction block, when it is determined that a last transaction block stored in the partial ledgers has been altered, the blockchain nodes may recover the altered transaction block with reference to an ending block for the last transaction block or another blockchain node participating in a consensus on the last transaction block. For example, when it is determined that the first transaction block 902 has been forged or altered, the second blockchain node may refer to the first blockchain node, based on the encrypted second transaction block 903_1. In another example, when it is determined that the third transaction block 904 has been forged or altered, the third blockchain node may refer to the first blockchain node, based on the fifth ending block 931.

According to an embodiment, the second blockchain node may verify an ending block in the second partial ledger 920. For example, the second blockchain node may verify whether an ending block for the first transaction block 902, which is the last transaction block, exists in the second partial ledger 920.

According to an embodiment, in response to a request for the fourth transaction block 905, the second blockchain node may determine whether an ending block therefor exists. For example, the second blockchain node may determine whether the second ending block 912, which is an ending block for the second blockchain node, exists in the third state 900_3. When the second ending block 912 exists, the second blockchain node may verify that the second partial ledger 920 has not been altered.

According to an embodiment, when an ending block for the last transaction block does not exist, the second blockchain node may determine that the second partial ledger 920 has been altered. Based on the determination result, the second blockchain node may recover the ending block with reference to a blockchain node (e.g., the first blockchain node) participating in the consensus on the last transaction block. For example, when the second ending block 912 does not exist, the second blockchain node may refer to the first partial ledger 910 of the first blockchain node through the first transaction block 902.

According to an embodiment, the second blockchain node may verify whether an ending block for a blockchain node other than the second blockchain node in the second partial ledger 920 has been forged or altered. For example, the second blockchain node may verify whether an ending block for a last transaction block of the second partial ledger 920 or an encrypted transaction block exists.

According to an embodiment, the second blockchain node may verify whether an ending block for another blockchain node exists in the second partial ledger 920, or whether an encrypted transaction block exists therein. The other blockchain node may indicate a blockchain node (e.g., the first blockchain node) participating in the consensus on the last transaction block.

According to an embodiment, the second blockchain node may determine whether an ending block for the first blockchain node exists. For example, the second blockchain node may determine whether the first ending block 911, which is an ending block for the first blockchain node, exists in the third state 900_3. When the first ending block 911 exists, the second blockchain node may determine that the second partial ledger 920 has not been altered.

According to an embodiment, when the first ending block 911 does not exist, the second blockchain node may determine whether an encrypted transaction block added by replacing the first ending block 911 exists. For example, the second blockchain node may verify whether the encrypted second transaction block 903_1 exists in the second partial ledger 920. According to an embodiment, when the first ending block 911 or the encrypted second transaction block 903_1 exists, the second blockchain node may determine that the second partial ledger 920 has not been altered.

According to an embodiment, when there is no encrypted transaction block or an ending block of another blockchain node for the last transaction block, the second blockchain node may determine that the second partial ledger 920 has been altered. For example, when the first ending block 911 or the encrypted second transaction block 903_1 does not exist, the second blockchain node may determine that the second partial ledger 920 has been altered.

According to an embodiment, when it is determined that the second partial ledger 920 has been altered, the ending block may be recovered with reference to a blockchain node (e.g., the first blockchain node) participating in the consensus on the last transaction block. For example, when the encrypted second transaction block 903_1 does not exist, the second blockchain node may recover a block with reference to the first partial ledger 910 of the first blockchain node.

According to an embodiment, the first blockchain node may recover, based on the encrypted second transaction block 903_1, an altered block of the first blockchain node. For example, it may be assumed that the second transaction block 903 and the third transaction block 904 included in the first blockchain node are deleted. At this time, although the first transaction block 902 exists as the last transaction block, the first blockchain node may determine, based on the encrypted second transaction block 903_1, that the first partial ledger 910 is altered by the deletion of the second transaction block 903. Therefore, the first blockchain node may acquire the encrypted second transaction block 903_1 from the second blockchain node. Furthermore, encrypted second block data #BLK2_D included in the encrypted second transaction block 903_1 may be decrypted using a private key of the first blockchain node, and the third transaction block 904 may be recovered based on the decrypted second transaction block with reference to the third blockchain node.

Each of the first to third blockchain nodes may recover an altered block in the partial ledger thereof by using a method similar to the above-described method.

According to an embodiment, when the fourth transaction block 905 is generated, the second blockchain node may replace the second ending block 912 with the fourth transaction block 905. For example, the second blockchain node may delete the second ending block 912 from the second partial ledger 920, and may add the fourth transaction block 905 as a chained block of the first transaction block 902.

According to an embodiment, when the fourth transaction block 905 is generated, the second blockchain node may generate a seventh ending block 941 for the fourth transaction block 905. For example, the second blockchain node may generate the seventh ending block 941 by performing an operation similar to the generation of the second ending block 912. For example, the second blockchain node may generate a seventh ending hash value BLK4_HH by adding additional information to fourth block information BLK4_H, which is information about the fourth transaction block, and hashing the same. Furthermore, the second blockchain node may generate seventh ending signature data S2_BLK4_HH by digitally signing the seventh ending hash value BLK4_HH by means of a private key of the second blockchain node. The second blockchain node may generate the seventh ending block 941 including the seventh ending hash value BLK4_HH and the seventh ending signature data S2_BLK4_HH, and may add the seventh ending block 941 to the second partial ledger 920 as an ending block for the fourth transaction block 905. According to an embodiment, the second blockchain node may transmit the seventh ending block 941 to the third blockchain node, and may acquire an eighth ending block 942 from the third blockchain node. The second blockchain node may add the acquired eighth ending block 942 to the second partial ledger 920 as an ending block for the fourth transaction block 905.

According to an embodiment, when the fourth transaction block 905 is generated, the third blockchain node may generate the eighth ending block 942 for the fourth transaction block 905. The third blockchain node may generate the eighth ending block 942 by performing an operation similar to that of the second blockchain node. According to an embodiment, the third blockchain node may add the generated eighth ending block 942 to the third partial ledger 930 as an ending block for the fourth transaction block 905. According to an embodiment, the third blockchain node may transmit the eighth ending block 942 to the second blockchain node, and may acquire the seventh ending block 941 from the second blockchain node. The third blockchain node may add the acquired seventh ending block 941 to the third partial ledger 930 as an ending block for the fourth transaction block 905.

According to an embodiment, when the fourth transaction block 905 is generated, the first blockchain node may replace the second ending block 912 for the second blockchain node with an encrypted fourth transaction block_1 905_1. Furthermore, when the fourth transaction block 905 is generated, the first blockchain node may replace the sixth ending block 932 for the third blockchain node with an encrypted fourth transaction block_2 905_2.

According to an embodiment, when the second ending block 912 is replaced with the fourth transaction block 905, the second blockchain node may generate the encrypted fourth transaction block_1 905_1. For example, the second blockchain node may to generate the encrypted fourth transaction block_1 905_1 by encrypting fourth block data BLK4_D by means of a public key of the second blockchain node in the fourth transaction block 905. Furthermore, the second blockchain node may transmit, to the first blockchain node, the encrypted fourth transaction block_1 905_1 including fourth block data_1 #BLK4_D_2 encrypted using the public key of the second blockchain node. When the encrypted fourth transaction block_1 905_1 is received from the second blockchain node, the first blockchain node according to an embodiment may replace the second ending block 912, which is an ending block related to the second blockchain node, with the encrypted fourth transaction block_1 905_1. Therefore, the second ending block 912 included in the first partial ledger 910 may be deleted, and the encrypted fourth transaction block_1 905_1 may be added as an ending block for the first transaction block 902. The first blockchain node according to an embodiment may determine, based on the encrypted fourth transaction block_1 905_1, that an ending transaction block included in the second partial ledger 920 of the second blockchain node is the fourth transaction block 905.

According to an embodiment, when the sixth ending block 932 is replaced with the fourth transaction block 905, the third blockchain node may generate the encrypted fourth transaction block_2 905_2. For example, the third blockchain node may generate the encrypted fourth transaction block_2 905_2 by encrypting in the fourth transaction block 905 the fourth block data BLK4_D by means of a public key of the third blockchain node. Furthermore, the third blockchain node may transmit, to the first blockchain node, the encrypted fourth transaction block_2 905_2 including fourth block data_2 #BLK4_D_3 encrypted using the public key of the third blockchain node. When the encrypted fourth transaction block_2 905_2 is received from the third blockchain node, the first blockchain node according to an embodiment may replace the sixth ending block 932, which is an ending block related to the third blockchain node, with the encrypted fourth transaction block_2 905_2. Therefore, the sixth ending block 932 included in the first partial ledger 910 may be deleted, and the encrypted fourth transaction block_2 905_2 may be added as an ending block for the third transaction block 904. The first blockchain node according to an embodiment may determine, based on the encrypted fourth transaction block_2 905_2, that an ending transaction block included in the third partial ledger 930 of the third blockchain node is the fourth transaction block 905.

Figure 10:
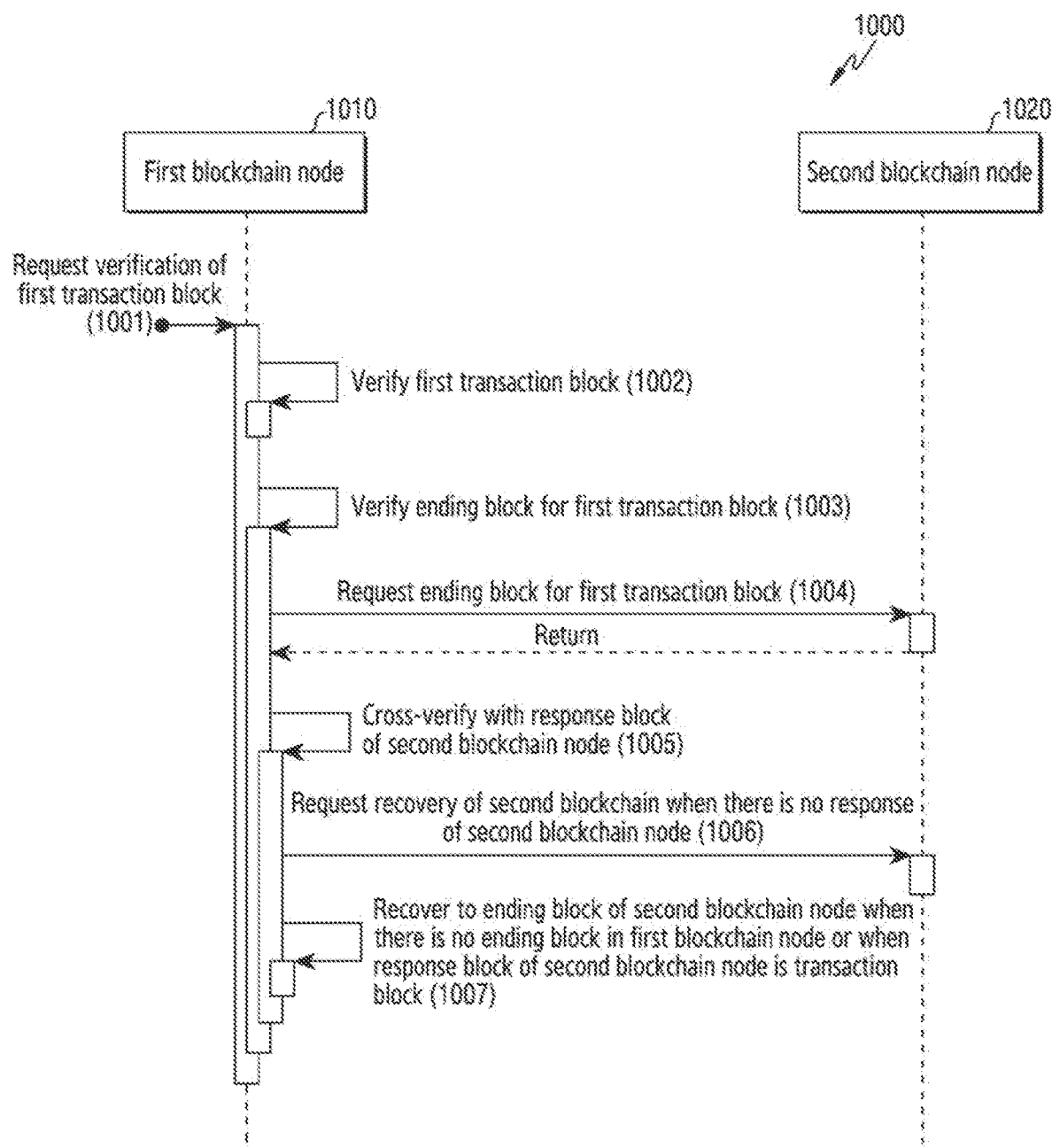
FIG. 10 is a flowchart illustrating an operation of verifying a first transaction block by an electronic device according to an embodiment.

FIG. 10 is a flowchart 1000 illustrating an operation of verifying a first transaction block by an electronic device according to an embodiment.

Referring to FIG. 10, operations of verifying a first transaction block (e.g., the first transaction block 902 in FIG. 9A) by a first blockchain node 1010 (e.g., the first blockchain node in FIGS. 1 to 9D) and a second blockchain node 1020 (e.g., the second blockchain node in FIGS. 1 to 9D) are shown. Hereinafter, blockchains included in a first partial ledger (e.g., the first partial ledger 910 in FIGS. 9A to 9D) of the first blockchain node 1010 and a second partial ledger (e.g., the second partial ledger 920 in FIG. 9A to 9D) of the second blockchain node 1020 may be referred to as a first blockchain and a second block chain, respectively. Operations of the first blockchain node 1010 and the second blockchain node 1020, described with reference to FIG. 10, may correspond to the operations of verifying the first transaction block 902 in response to the request for the second transaction block 903, described with reference to FIGS. 9A and 9B. Therefore, a description identical to or similar to the description made with reference to FIGS. 9A and 9B may be omitted.

According to an embodiment, in relation to generation of a second transaction block (e.g., the second transaction block 903 in FIG. 9B), in operation 1001, the first blockchain node 1010 may receive a request for verification of the first transaction block. For example, in order to add the second transaction block to a distributed ledger included in a blockchain network, the first blockchain node 1010 may receive the request for verification of the first transaction block as an operation of verifying whether the distributed ledger has been forged or altered.

In operation 1002, the first blockchain node 1010 according to an embodiment may verify the first transaction block. For example, the first blockchain node 1010 may verify, based on the first block information BLK1_H and the first signature information S1_BLK1_H and S2_BLK1_H included in the first transaction block, whether the first transaction block has been generated based on a normal consensus and whether the first transaction block has been forged or altered.

According to an embodiment, in operation 1003, the first blockchain node 1010 may verify an ending block for the first transaction block. For example, the first blockchain node 1010 may verify the ending block, based on whether there are ending blocks (e.g., the first ending block 911 and the second ending block 912 in FIG. 9A) linked to an ending transaction block of the first blockchain.

Operation 1003 in which the first blockchain node 1010 according to an embodiment verifies the ending block for the first transaction block may include operation 1004 to 1007. According to an embodiment, in operation 1004, the first blockchain node 1010 may request the second blockchain node 1020 for the ending block (e.g., the first ending block 911 and the second ending block 912 in FIG. 9A) for the first transaction block.

According to an embodiment, in operation 1005, when a response block is received from the second blockchain node 1020 in response to operation 1004, the first blockchain node 1010 may cross-verify, based on whether the response block of the second blockchain node is the same as the ending block for the first transaction block included in the first blockchain of the first blockchain node 1010, the first blockchain and the second blockchain. For example, when the ending block for the first transaction block included in the first blockchain is different from the response block of the second blockchain, the first blockchain node 1010 may determine that the first blockchain or the second blockchain has been forged or altered.

According to an embodiment, when there is no response from the second blockchain node in response to operation 1004, the first blockchain node 1010 may request recovery of the second blockchain in operation 1006. For example, when there is no response from the second blockchain node, the first blockchain node 1010 may determine that the second blockchain of the second blockchain node has been forged or altered. Therefore, the first blockchain node 1010 may transmit the ending blocks for the first transaction block included in the first blockchain to the second blockchain node and request the recovery of the second blockchain.

According to an embodiment, in operation 1007, when there is no ending block in the first blockchain node or when the response block of the second blockchain node is a transaction block, the first blockchain node 1010 may recover the forged or altered first blockchain by using an ending block of the second blockchain node. For example, when there is no ending block linked to the first transaction block, the first blockchain node 1010 may determine that the first blockchain has been forged or altered, and may recover the first blockchain with reference to the second blockchain of the second blockchain node 1020. Furthermore, when the response block of the second blockchain node is a transaction block, the first blockchain node 1010, for example, may determine the first transaction block is not the last transaction block, and may determine that the first blockchain has been forged or altered. Therefore, the first blockchain node 1010 may recover the first blockchain with reference to the second blockchain of the second blockchain node 1020.

When the second transaction block is generated after the first transaction block in the blockchain network, the first blockchain node 1010 and the second blockchain node 1020 according to an embodiment may perform operations 1001 to 1007 to verify the first transaction block and an ending block linked to the first transaction block.

Figure 11:
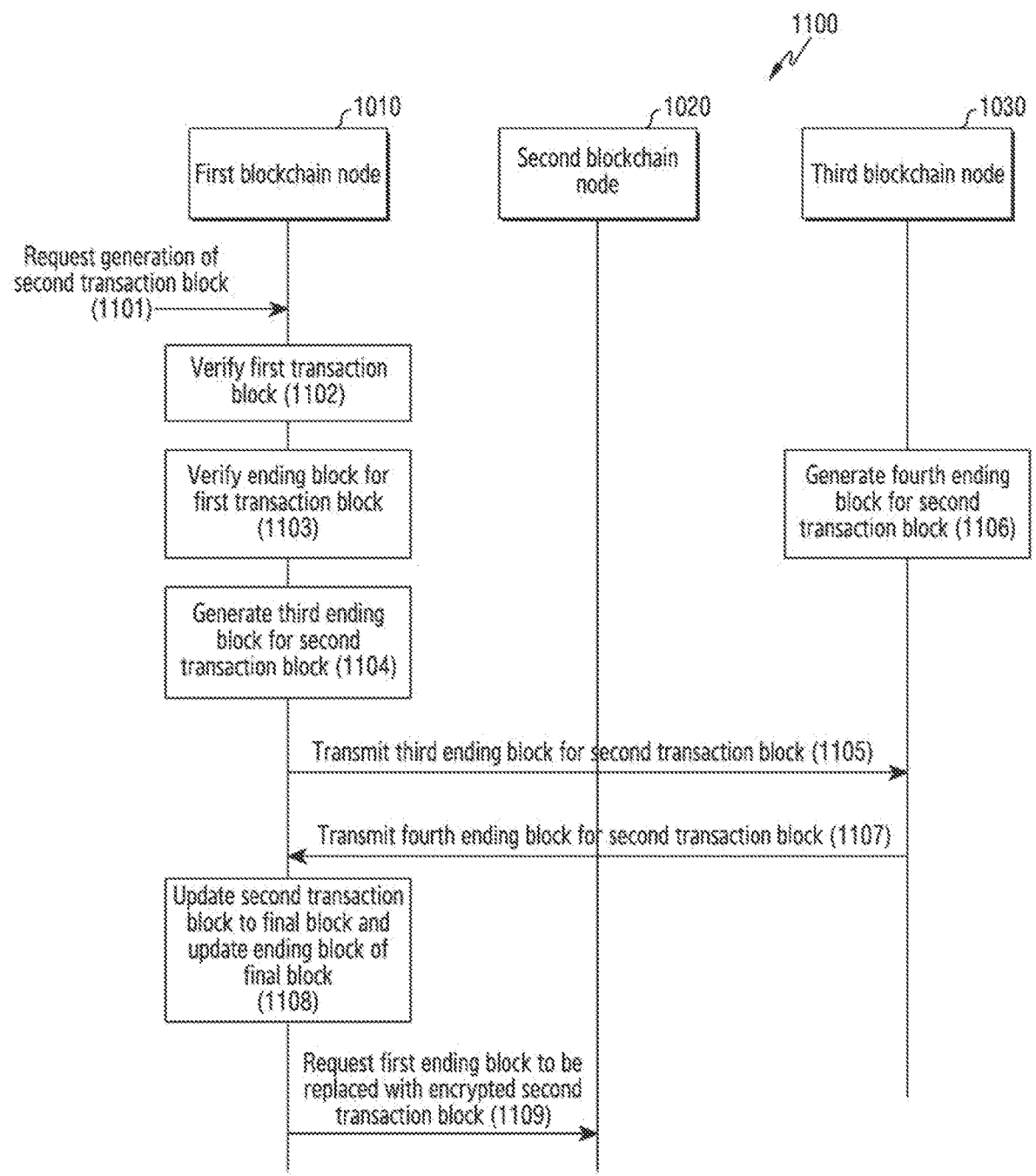
FIG. 11 is a flowchart illustrating an operation of generating an ending block for a second transaction block by an electronic device according to an embodiment.

FIG. 11 is a flowchart 1100 illustrating an operation of generating an ending block for a second transaction block by an electronic device according to an embodiment.

Referring to FIG. 11, operations of generating an ending block for a second transaction block (e.g., the second transaction block 903 in FIG. 9B) by a first blockchain node 1010 (e.g., the first blockchain node in FIGS. 1 to 9D), a second blockchain node 1020 (e.g., the second blockchain node in in FIGS. 1 to 9D), and a third blockchain node 1030 (e.g., the third blockchain node in FIGS. 1 to 9D) are shown. The operations of the first blockchain node 1010, the second blockchain node 1020, and the third blockchain node 1030, described with reference to FIG. 11, may correspond to the operation of generating an ending block for the second transaction block 903, described with reference to FIG. 9B. Therefore, a description identical or similar to the description made with reference to FIG. 9B may be omitted.

According to an embodiment, in operation 1101, the first blockchain node 1010 may receive a request for generation of the second transaction block. The second transaction block according to an embodiment may be generated based on the consensus between the first blockchain node 1010 and the third blockchain node 1030.

According to an embodiment, in operation 1102, the first blockchain node 1010 may verify a first transaction block in response to the request for generation of the second transaction block which is a block generated after the first transaction block in a blockchain network. For example, the first blockchain node 1010 may verify the first transaction block by performing operation 1002 described with reference to FIG. 10.

According to an embodiment, in operation 1103, the first blockchain node 1010 may verify an ending block for the first transaction block. For example, the first blockchain node 1010 may verify an ending block for the first transaction block by performing operations 1003 to 1007 described with reference to FIG. 10.

According to an embodiment, in operation 1104, the first blockchain node 1010 may generate a third ending block (e.g., the third ending block 921 in FIG. 9B) for the second transaction block. For example, the first blockchain node 1010 may generate the third ending block that includes the third ending hash value BLK2_HH, obtained by adding additional information to the second block information BLK2_H, which is information about the second transaction block, and hashing the same, and the third ending signature data S1_BLK2 obtained by digitally signing the third ending hash value BLK2_HH by means of a private key of the first blockchain node 1010.

According to an embodiment, in operation 1106, the third blockchain node 1030 may generate a fourth ending block (e.g., the fourth ending block 922 in FIG. 9B) for the second transaction block. For example, the third blockchain node 1030 may generate the fourth ending block that includes a fourth ending hash value BLK2_HH, obtained by adding additional information to the second block information BLK2_H, which is information about the second transaction block, and hashing the same), and fourth ending signature data S3_BLK2_HH, obtained by digitally signing the fourth ending hash value BLK2_HH by means of a private key of the third blockchain node 1030.

According to an embodiment, in operation 1105, the first blockchain node 1010 may transmit the third ending block for the second transaction block to the third blockchain node 1030. Furthermore, in operation 1107, the third blockchain node 1030 according to an embodiment may transmit the fourth ending block for the second transaction block to the first blockchain node 1010.

According to an embodiment, in operation 1108, the first blockchain node 1010 may update the second transaction block to a final block, and may update an ending block of the final bloc. For example, the first blockchain node 1010 may update the second transaction block to an ending transaction block of a first blockchain, and may update the third ending block and the fourth ending block to ending blocks for the second transaction block. According to an embodiment, the third blockchain node 1030 may update a third partial ledger (e.g., the third partial ledger 930 in FIG. 9B) of the third blockchain node 1030 by performing an operation similar to operation 1108 of the first blockchain node 1010.

According to an embodiment, in operation 1109, the first blockchain node 1010 may request the second blockchain node 1020 to generate encrypted second transaction block (e.g., the encrypted second transaction block 903_1 in FIG. 9B) and to replace a first ending block with the encrypted second transaction block. For example, the first blockchain node 1010 may request that the first ending block, which is an ending block for the first blockchain node 1010 included in a second blockchain should be replaced with the encrypted second transaction block. According to an embodiment, the encrypted second transaction block may include encrypted second block data #BLK2_D_1 that the first blockchain node 1010 generates by encrypting the second block data BLK2_D by means of a public key of the first blockchain node 1010. According to an embodiment, the second blockchain node 1020 may replace the first ending block with the encrypted second transaction block in response to the request of the first blockchain node 1010. Therefore, it is verified, based on the encrypted second transaction block, that the ending transaction block of the first blockchain of the first blockchain node 1010 is not the first transaction block but the second transaction block.

Figure 12:
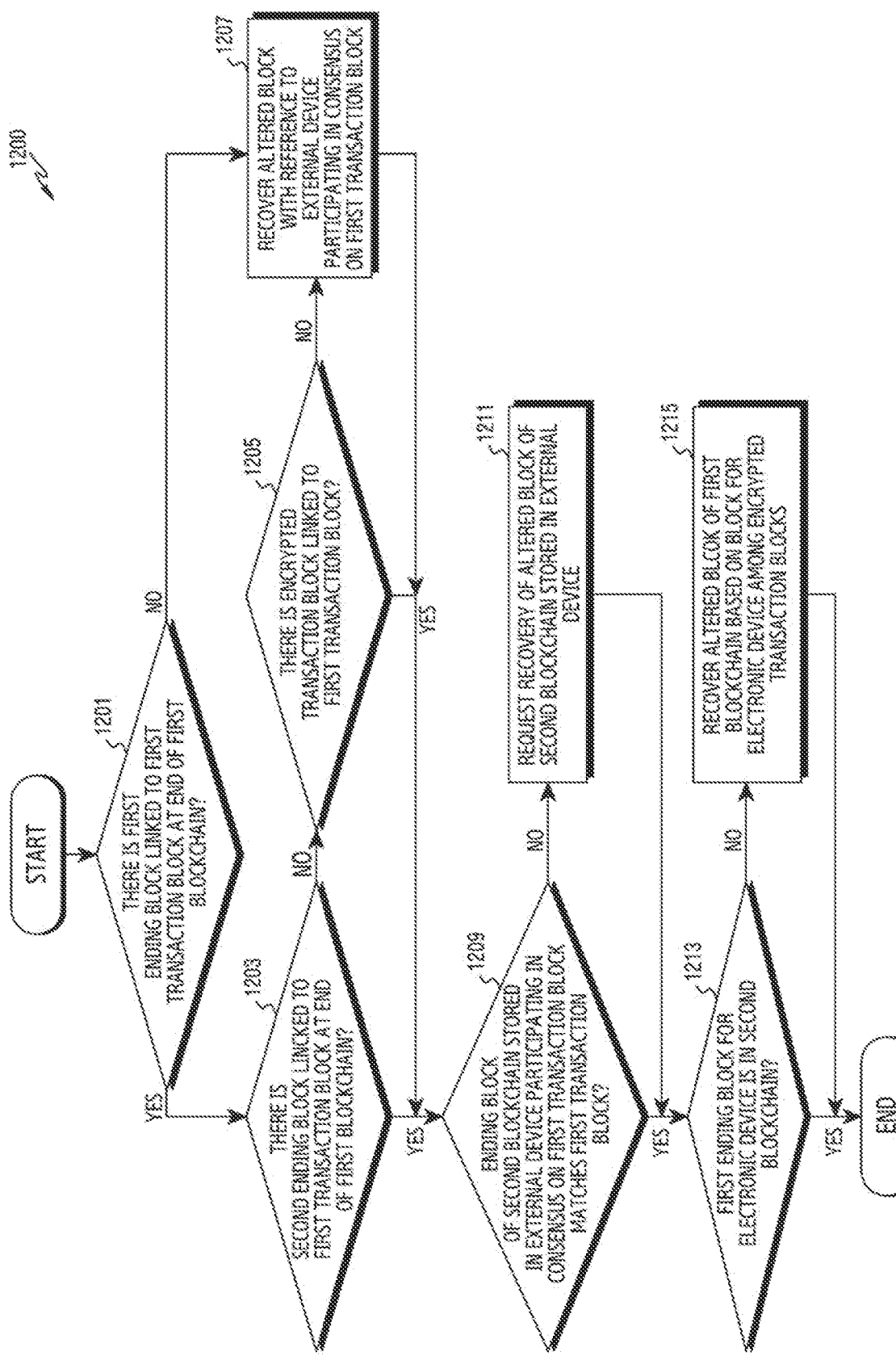
FIG. 12 is a flowchart illustrating an operation of verifying alteration of a block, based on an ending block, and recovering the altered block by an electronic device according to an embodiment.

FIG. 12 is a flowchart 1200 illustrating an operation of verifying alteration of a block, based on an ending block, and recovering the altered block by an electronic device according to an embodiment.

Referring to FIG. 12, in operation 120, the electronic device 100 (e.g., the first blockchain node in FIGS. 9A to 9D) may determine whether there is a first ending block (e.g., the first ending block 911) for a transaction block (e.g., the first transaction block 902) at the end of a first blockchain (e.g., the first blockchain in FIG. 11). For example, the electronic device 100 may determine whether there is the first ending block linked to a first transaction block at the end of the first blockchain included in the first partial ledger 910.

According to an embodiment, when there is no first ending block, in operation 1207, the electronic device 100 may recover an altered block with reference to an external device (e.g., the second blockchain node described with reference to FIG. 9A) participating in a consensus on the first transaction block. For example, when the first ending block for the first transaction block, related to the electronic device 100, is not in the first blockchain, the electronic device 100 may make a request to the external device for an ending block for the electronic device 100 that is stored in the external device. The electronic device 100 may recover an altered block, based on a block received in response to the request.

According to an embodiment, when there is the first ending block, the electronic device 100 may determine, in operation 1203, whether there is a second ending block (e.g., the second ending block 912) for the first transaction block at the end of the first blockchain.

According to an embodiment, when there is no second ending block, the electronic device 100 may determine, in operation 1205, whether there is an encrypted transaction block (e.g., the encrypted second transaction block 903_1) for the first transaction block exists at the end of the first blockchain.

According to an embodiment, when there is no the encrypted transaction block for the first transaction block at the end of the first blockchain, the electronic device 100 may determine that the first blockchain has been altered. Therefore, in operation 1207, the electronic device 100 may recover the altered block with reference to the external device participating in the consensus on the first transaction block.

According to an embodiment, the electronic device 100 may perform operation 1209 when there is the second ending block or when there is the encrypted transaction block. Furthermore, when altered block among blocks included in the first blockchain is recovered in operation 1207, the electronic device 100 may perform operation 1209.

According to an embodiment, in operation 1209, the electronic device 100 may determine whether an ending block of a second blockchain stored in the external device participating in the consensus on the first transaction block matches the first transaction block.

According to an embodiment, when the ending block of the second blockchain does not match the first transaction block, the electronic device 100 may recover, in operation 1211, an altered block of the second blockchain stored in the external device. For example, the electronic device 100 may transmit information about the altered block to the second blockchain node such that the altered block of the second blockchain is recovered with reference to the first blockchain.

According to an embodiment, when the ending block of the second blockchain matches the first transaction block or when the altered block of the second blockchain is recovered, the electronic device 100 may determine, in operation 1013, whether there is the first ending block for the electronic device 100 in the second blockchain. In an embodiment, when there is the first ending block, the electronic device 100 may end the verification of the partial ledger.

According to an embodiment, when the first ending block for the electronic device 100 is not in the second blockchain, in operation 1215, the electronic device 100 may recover the first blockchain, based on a block (e.g., the encrypted second transaction block 903_1) for the electronic device among the encrypted transaction blocks.

According to an embodiment, the descriptions made with reference to FIGS. 10 to 12 may be applied without being limited to the first transaction block and the second transaction block when a new transaction block is generated in the blockchain network. For example, when a third transaction block (e.g., the third transaction block 904 in FIG. 9C) is generated, the blockchain nodes may perform similar operations.

Figure 13:
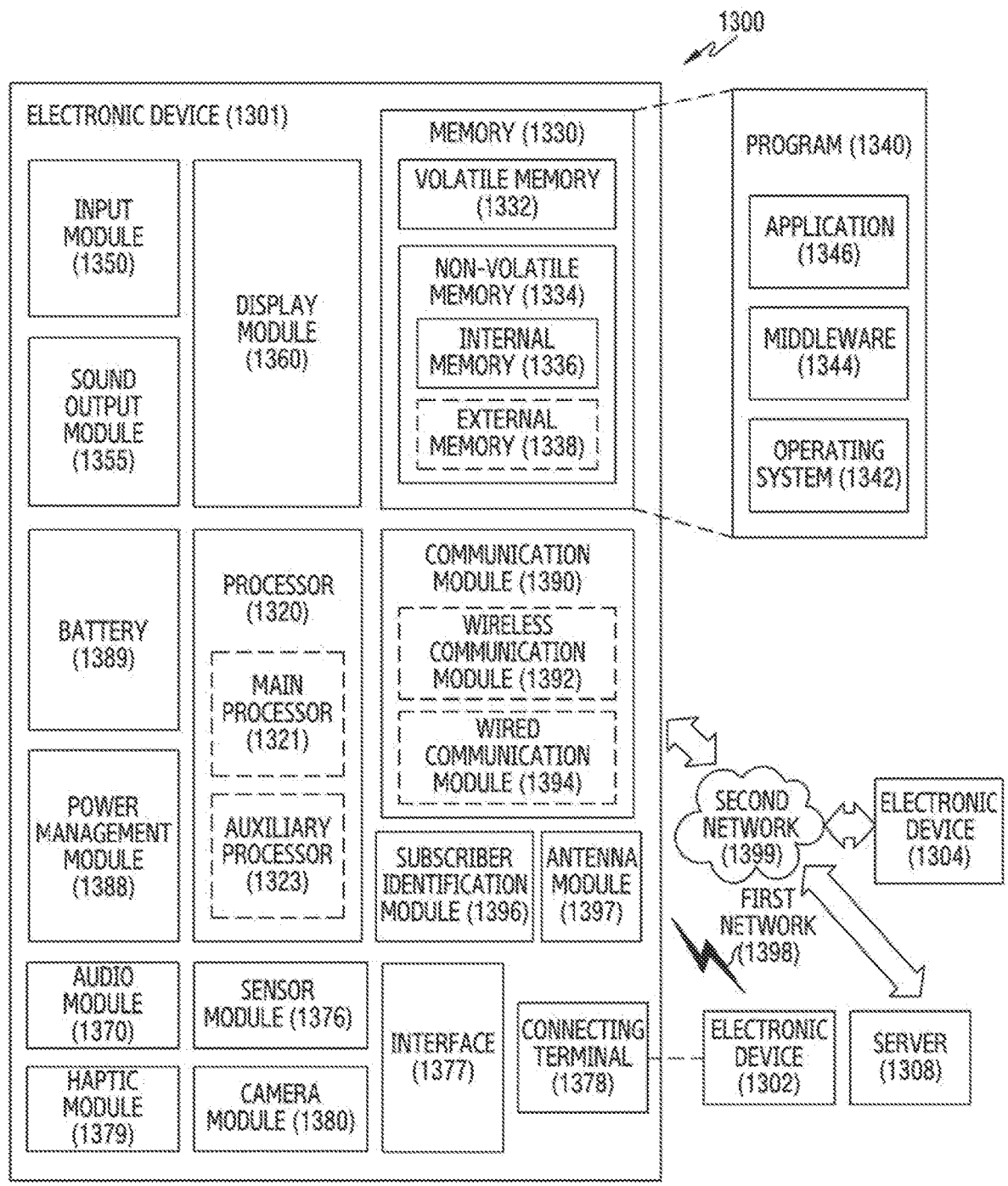
FIG. 13 is a block diagram illustrating an electronic device in a network environment according to various embodiments.

FIG. 13 is a block diagram illustrating an electronic device 1301 in a network environment 1300 according to various embodiments. Referring to FIG. 13, the electronic device 1301 in the network environment 1300 may communicate with an electronic device 1302 via a first network 1398 (e.g., a short-range wireless communication network), or at least one of an electronic device 1304 or a server 1308 via a second network 1399 (e.g., a long-range wireless communication network). According to an embodiment, the electronic device 1301 may communicate with the electronic device 1304 via the server 1308. According to an embodiment, the electronic device 1301 may include a processor 1320, memory 1330, an input module 1350, a sound output module 1355, a display module 1360, an audio module 1370, a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. In some embodiments, at least one of the components (e.g., the connecting terminal 1378) may be omitted from the electronic device 1301, or one or more other components may be added in the electronic device 1301. In some embodiments, some of the components (e.g., the sensor module 1376, the camera module 1380, or the antenna module 1397) may be implemented as a single component (e.g., the display module 1360).

The processor 1320 may execute, for example, software (e.g., a program 1340) to control at least one other component (e.g., a hardware or software component) of the electronic device 1301 coupled with the processor 1320, and may perform various data processing or computation. According to one embodiment, as at least part of the data processing or computation, the processor 1320 may store a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), or an auxiliary processor 1323 (e.g., a graphics processing unit (GPU), a neural processing unit (NPU), an image signal processor (ISP), a sensor hub processor, or a communication processor (CP)) that is operable independently from, or in conjunction with, the main processor 1321. For example, when the electronic device 1301 includes the main processor 1321 and the auxiliary processor 1323, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display module 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323. According to an embodiment, the auxiliary processor 1323 (e.g., the neural processing unit) may include a hardware structure specified for artificial intelligence model processing. An artificial intelligence model may be generated by machine learning. Such learning may be performed, e.g., by the electronic device 1301 where the artificial intelligence is performed or via a separate server (e.g., the server 1308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1330 may store various data used by at least one component (e.g., the processor 1320 or the sensor module 1376) of the electronic device 1301. The various data may include, for example, software (e.g., the program 1340) and input data or output data for a command related thererto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input module 1350 may receive a command or data to be used by another component (e.g., the processor 1320) of the electronic device 1301, from the outside (e.g., a user) of the electronic device 1301. The input module 1350 may include, for example, a microphone, a mouse, a keyboard, a key (e.g., a button), or a digital pen (e.g., a stylus pen).

The sound output module 1355 may output sound signals to the outside of the electronic device 1301. The sound output module 1355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1360 may visually provide information to the outside (e.g., a user) of the electronic device 1301. The display module 1360 may include, for example, a display, a hologram device, or a projector and control circuitry to control a corresponding one of the display, hologram device, and projector. According to an embodiment, the display module 1360 may include a touch sensor adapted to detect a touch, or a pressure sensor adapted to measure the intensity of force incurred by the touch.

The audio module 1370 may convert a sound into an electrical signal and vice versa. According to an embodiment, the audio module 1370 may obtain the sound via the input module 1350, or output the sound via the sound output module 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wired) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The wireless communication module 1392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., the mmWave band) to achieve, e.g., a high data transmission rate. The wireless communication module 1392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1392 may support various requirements specified in the electronic device 1301, an external electronic device (e.g., the electronic device 1304), or a network system (e.g., the second network 1399). According to an embodiment, the wireless communication module 1392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1397 may transmit or receive a signal or power to or from the outside (e.g., the external electronic device) of the electronic device 1301. According to an embodiment, the antenna module 1397 may include an antenna including a radiating element composed of a conductive material or a conductive pattern formed in or on a substrate (e.g., a printed circuit board (PCB)). According to an embodiment, the antenna module 1397 may include a plurality of antennas (e.g., array antennas). In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment, another component (e.g., a radio frequency integrated circuit (RFIC)) other than the radiating element may be additionally formed as part of the antenna module 1397.

According to various embodiments, the antenna module 1397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1301 and the external electronic device 1304 via the server 1308 coupled with the second network 1399. Each of the electronic devices 1302 or 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example. The electronic device 1301 may provide ultra low-latency services using, e.g., distributed computing or mobile edge computing. In another embodiment, the external electronic device 1304 may include an internet-of-things (IoT) device. The server 1308 may be an intelligent server using machine learning and/or a neural network. According to an embodiment, the external electronic device 1304 or the server 1308 may be included in the second network 1399. The electronic device 1301 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device included as a blockchain node in a blockchain network, the electronic device comprising:
    a communication circuit configured to communicate with at least one external device;
    memory storing instructions and a partial ledger including a part of a full ledger for the blockchain network; and
    at least one processor,
    wherein the instructions, when executed by the at least one processor individually or collectively, cause the electronic device to:
        based on a first transaction block being generated at an end of a blockchain included in the partial ledger stored in the memory, generate a first ending hash value based on first identification data of the first transaction block;
        generate first ending signature data by signing the first ending hash value with a private key stored in the memory;
        generate a first ending block as a block chained after the first transaction block, and store the first ending block in the memory, wherein the first ending block includes the first ending signature data and the first ending hash value;
        receive, through the communication circuit, a second ending block from a first external device participating in a consensus on the first transaction block, wherein the second ending block includes the first ending hash value and second ending signature data, and the second ending signature data includes the first ending hash value signed with a private key of the first external device;
        store the second ending block in the memory along with the first ending block; and
        verify alteration of the blockchain, based on the first ending block and the second ending block,
    wherein the first ending block and the second ending block are last blocks chained after the first transaction block in the blockchain included in the partial ledger.

2. The electronic device of claim 1, wherein the instructions, when executed by the at least one processor individually or collectively, further cause the electronic device to:
    receive a third ending block from a second external device participating in the consensus on the first transaction block; and
    store the third ending block in the memory as an additional block chained after the first transaction block, wherein the third ending block includes the first ending hash value and third ending signature data, and the third ending signature data includes the first ending hash value signed with a private key of the second external device.

3. The electronic device of claim 1, wherein the instructions, when executed by the at least one processor individually or collectively, further cause the electronic device to:
    based on a second transaction block being generated in the blockchain network, replace the first ending block with the second transaction block, wherein the electronic device participates in the consensus on the first transaction block and a consensus on the second transaction block;
generate a second ending hash value, based on second identification data of the second transaction block;
generate fourth ending signature data by signing the first ending hash value with the private key stored in the memory;
generate a fourth ending block as a block chained after the second transaction block, wherein the fourth ending block includes the fourth ending signature data and the second ending hash value; and
store the fourth ending block in the memory.

4. The electronic device of claim 3, wherein the instructions, when executed by the at least one processor individually or collectively, further cause the electronic device to:
determine whether the first external device participates in the consensus on the second transaction block;
based on determining that the first external device participates in the consensus on the second transaction block, delete the second ending block;
receive, through the communication circuit, a fifth ending block from the first external device, wherein the fifth ending block includes the second ending hash value and fifth ending signature data, and the fifth ending signature data includes the second ending hash value signed with the private key of the first external device; and
store the fifth ending block in the memory.

5. The electronic device of claim 1, wherein the instructions, when executed by the at least one processor individually or collectively, further cause the electronic device to:
based on the electronic device not participating in a consensus on a third transaction block generated in the blockchain network, acquire an encrypted transaction block from an external device participating in the consensus on the third transaction block, wherein the encrypted transaction block is generated by encrypting the third transaction block using a public key of the external device;
detect an ending block associated with the external device participating in the consensus on the third transaction block; and
replace the detected ending block with the encrypted transaction block.

6. The electronic device of claim 1, wherein the instructions, when executed by the at least one processor individually or collectively, further cause the electronic device to:
verify the first transaction block, based on first signature data, second signature data, and a public key of the first external device included in the first transaction block, wherein the first signature data includes the first identification data signed with the private key stored in the memory, and the second signature data includes the first identification data signed with the private key of the first external device.

7. The electronic device of claim 3, wherein the instructions, when executed by the at least one processor individually or collectively, further cause the electronic device to:
based on the second transaction block being generated in the blockchain network:
determine whether the first ending block for the first transaction block exists in the memory;
determine whether an encrypted transaction block or the second ending block for the first transaction block exists in the memory; and
verify the partial ledger, based on results of the determinations.

8. The electronic device of claim 7, wherein the instructions, when executed by the at least one processor individually or collectively, further cause the electronic device to:
acquire the first ending block from the first external device, based on determining that the first ending block does not exist in the memory, and store the first ending block in the memory; and
acquire the encrypted transaction block or the second ending block from the first external device, based on determining that the second ending block or the encrypted transaction block does not exist in the memory, and store the encrypted transaction block or the second ending block in the memory.

9. A method for operating an electronic device included as a blockchain node in a blockchain network, the method comprising:
storing a partial ledger including a part of a full ledger for the blockchain network;
based on to a first transaction block being generated at an end of a blockchain included in the partial ledger, generating a first ending hash value based on first identification data of the first transaction block;
generating first ending signature data by signing the first ending hash value with a private key of the electronic device;
generating a first ending block including the first ending signature data and the first ending hash value;
storing the first ending block in the electronic device as a block chained after the first transaction block;
receiving a second ending block from a first external device participating in a consensus on the first transaction block, wherein the second ending block includes the first ending hash value and second ending signature data, and the second ending signature data includes the first ending hash value signed with a private key of the first external device;
storing the second ending block in the electronic device along with the first ending block; and
verifying alteration of the blockchain, based on the first ending block and the second ending block,
wherein the first ending block and the second ending block are last blocks chained after the first transaction block in the blockchain included in the partial ledger.

10. The method of claim 9, further comprising:
receiving a third ending block from a second external device participating in the consensus on the first transaction block; and
storing the third ending block in the electronic device as an additional block chained after the first transaction block, wherein the third ending block includes the first ending hash value and third ending signature data, and the third ending signature data includes the first ending hash value signed with a private key of the second external device.

11. The method of claim 9, further comprising:
based on generation of a second transaction block after the generation of the first transaction block, replacing the first ending block with the second transaction block;
generating a second ending hash value, based on second identification data of the second transaction block;
generating fourth ending signature data by signing the first ending hash value with the private key of the electronic device;
generating a fourth ending block as a block chained after the second transaction block, wherein the fourth ending block includes the fourth ending signature data and the second ending hash value; and storing the fourth ending block in the electronic device.

12. The method of claim 11, further comprising:

determining whether the first external device participates in a consensus on the second transaction block;

deleting the second ending block in response to determining that the first external device participates in the consensus on the second transaction block;

receiving a fifth ending block from the first external device, wherein the fifth ending block includes the second ending hash value and fifth ending signature data, and the fifth ending signature data includes the second ending hash value signed with the private key of the first external device; and storing the fifth ending block in the electronic device.

13. The method of claim 9, further comprising:

acquiring an encrypted transaction block from an external device participating in a consensus on a third transaction block, based on the electronic device not participating in the consensus on the third transaction block, wherein the encrypted transaction block is generated by encrypting the third transaction block;

detecting an ending block associated with the external device participating in the consensus on the third transaction block; and replacing the detected ending block with the encrypted transaction block.

14. The method of claim 11, further comprising:

based on the second transaction block being generated in the blockchain network, determining whether the first ending block for the first transaction block exists in the memory;

based on the second transaction block being generated in the blockchain network, determining whether an encrypted transaction block or the second ending block for the first transaction block exists in the memory; and verifying the partial ledger, based on results of the determinations.

15. The method of claim 14, further comprising:

based on determining that the first ending block does not exist in the memory, acquiring the first ending block from the first external device and storing the first ending block in the electronic device; and based on determining that the second ending block or the encrypted transaction block does not exist in the memory, acquiring the encrypted transaction block or the second ending block from the first external device and storing the encrypted transaction block or the second ending block in the electronic device.

16. An electronic device included as a blockchain node in a blockchain network, the electronic device comprising:

memory storing instructions and a partial ledger including a part of a full ledger for the blockchain network; and at least one processor, wherein the instructions, when executed by the at least one processor individually or collectively, cause the electronic device to:

based on first signature data and first identification data of a first transaction block at an end of a blockchain included in the partial ledger, verify whether the blockchain has been altered;

determine whether a first ending block for the first transaction block exists in the memory, wherein the first ending block includes a first ending hash value generated based on the first identification data, and first ending signature data, and the first ending signature data includes the first ending hash value signed with a private key stored in the memory;

determine whether a second ending block for the first transaction block exists in the memory, wherein the second ending block includes the first ending hash value and second ending signature data, and the second ending signature data includes the first ending hash value signed with a private key of a first external device participating in a consensus on the first transaction block;

based on determining that the second ending block does not exist in the memory, determine whether an encrypted second transaction block exists in the memory, and verify alteration of the blockchain, based on the first ending block, and based on the second ending block or the encrypted second transaction block, wherein the first ending block, the second ending block and the encrypted second transaction block are last blocks chained after the first transaction block in the blockchain included in the partial ledger.

17. The electronic device of claim 16, wherein the instructions, when executed by the at least one processor individually or collectively, further cause the electronic device to:

based on determining that the first ending block does not exist in the memory, acquire the first ending block from the first external device; and store the first ending block in the memory.

18. The electronic device of claim 17, wherein the instructions, when executed by the at least one processor individually or collectively, further cause the electronic device to:

based on determining that the second ending block or the encrypted second transaction block does not exist in the memory, acquire the encrypted second transaction block or the second ending block from the first external device and store the second ending block or the encrypted second transaction block in the memory.

19. The electronic device of claim 16, wherein the instructions, when executed by the at least one processor individually or collectively, further cause the electronic device to:

determine whether the first transaction block exists in a partial ledger of the first external device; and based on determining that the first transaction block does not exist in the partial ledger of the first external device, transmit the first transaction block to the first external device.

20. The electronic device of claim 16, wherein the instructions, when executed by the at least one processor individually or collectively, further cause the electronic device to:

determine whether the first ending block exists in a partial ledger of the first external device;

based on determining that the first ending block does not exist in the partial ledger of the first external device, determine whether an encrypted third transaction block for the electronic device exists in the partial ledger of the first external device;

based on determining that the encrypted third transaction block exists in the partial ledger of the first external device, acquire information about a third transaction block from a second external device participating in a consensus on the third transaction block; and store the third transaction block as an ending block of the blockchain.

* * * * *